United States Patent
Gao

(10) Patent No.: US 11,489,629 B2
(45) Date of Patent: Nov. 1, 2022

(54) TRANSMISSION METHOD, DEVICE, TERMINAL, BASE STATION AND STORAGE MEDIUM

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 151 days.

(21) Appl. No.: 16/645,510

(22) PCT Filed: Jun. 25, 2018

(86) PCT No.: PCT/CN2018/092691
§ 371 (c)(1),
(2) Date: Mar. 9, 2020

(87) PCT Pub. No.: WO2019/047590
PCT Pub. Date: Mar. 14, 2019

(65) Prior Publication Data
US 2020/0280396 A1 Sep. 3, 2020

(30) Foreign Application Priority Data
Sep. 8, 2017 (CN) .......................... 201710807163.4

(51) Int. Cl.
*H04L 1/18* (2006.01)
*H04W 72/04* (2009.01)

(52) U.S. Cl.
CPC ......... *H04L 1/1812* (2013.01); *H04W 72/042* (2013.01)

(58) Field of Classification Search
CPC ... H04L 1/1812; H04L 1/1628; H04L 1/1861; H04L 5/0091; H04L 5/0023;
(Continued)

(56) References Cited

U.S. PATENT DOCUMENTS 9,385,851 B2 * 7/2016 Seo .................. H04L 1/1692
2016/0295561 A1 10/2016 Papasakellariou
(Continued)

FOREIGN PATENT DOCUMENTS

CN 101951684 A 1/2011
CN 101958775 A 1/2011
(Continued)

OTHER PUBLICATIONS

Intel Corporation; "Views on HARQ-ACK feedback for CA enhancemen"; 3GPP TSG-RAN WG1 #82Bis; R1-155306; Malmö, Sweden, Oct. 5-9, 2015.
(Continued)

*Primary Examiner* — Hanh N Nguyen
(74) *Attorney, Agent, or Firm* — Kilpatrick Townsend & Stockton, LLP

(57) ABSTRACT

Disclosed in the invention are a transmission method, a device, a terminal, a base station and a storage medium. The method comprises: the terminal receiving a downlink transmission; and sorting ACK/NACK feedback information of the downlink transmission according to a DAI corresponding to the downlink transmission, to obtain an ACK/NACK sequence to be fed back, and sending same. The DAI performs cumulative counting on the downlink transmission, according to at least the order of a transmitting and receiving node (TRP). Provided is a transmission scheme in which ACK/NACK feedback can be performed in a case where the terminal simultaneously receives two PDSCHs in the same serving cell.

20 Claims, 5 Drawing Sheets

```
                    ┌─ S101
┌──────────────────────────────────────┐
│   Receiving the downlink transmissions│
└──────────────────────────────────────┘
                    │
                    ▼ ┌─ S102
┌──────────────────────────────────────────────────┐
│ Sorting the ACK/NACK feedback information of the │
│   downlink transmissions according to the DAIs   │
│  corresponding to the downlink transmissions to  │
│  obtain and transmit the ACK/NACK sequence to be │
│  fed back, wherein the DAIs cumulatively count   │
│  the downlink transmissions at least in order of │
│                     TRPs                         │
└──────────────────────────────────────────────────┘
```

(58) Field of Classification Search
CPC ..... H04L 5/0055; H04L 1/1607; H04L 5/003; H04L 1/1864; H04W 72/042; H04W 72/1289; H04B 7/0626
See application file for complete search history.

(56) References Cited

U.S. PATENT DOCUMENTS

| | | |
|---|---|---|
| 2017/0237540 A1 | 8/2017 | Ahn et al. |
| 2018/0019842 A1* | 1/2018 | Fu .......................... H04L 1/1864 |
| 2021/0288696 A1* | 9/2021 | Jung ................... H04B 7/0626 |

FOREIGN PATENT DOCUMENTS

| | | |
|---|---|---|
| CN | 102136895 A | 7/2011 |
| CN | 102158324 A | 8/2011 |
| CN | 103339893 A | 10/2013 |
| CN | 106160983 A | 11/2016 |
| EP | 3193550 A1 | 7/2017 |
| WO | 2016108658 A1 | 7/2016 |

OTHER PUBLICATIONS

Samsung; "HARQ-ACK codebook determination"; 3GPP TSG RAN WG1 Meeting #89; R1-1708025; Hangzhou, P.R. China May 15-19, 2017.
ZTE; "Multi-TRP Transmission and interference coordination"; 3GPP TSG RAN WG1 Meeting #90; R1-1712289 Prague, Czechia Aug. 21-25, 2017.

* cited by examiner

TRANSMISSION METHOD, DEVICE, TERMINAL, BASE STATION AND STORAGE MEDIUM

The present application is a US National Stage of International Application No. PCT/CN2018/092691, filed Jun. 25, 2018, which claims priority to Chinese Patent Application No. 201710807163.4, filed with the Chinese Patent Office on Sep. 8, 2017 and entitled "Transmission Method, Device, User equipment, Base Station and Storage Medium", which is hereby incorporated by reference in its entirety.

FIELD

The invention relates to the field of communication technologies, and particularly to a transmission method, a device, a user equipment, a base station and a storage medium.

BACKGROUND

In a Long Term Evolution (LTE) system, a user equipment can only receive one downlink shared channel (PDSCH) in a subframe in one serving cell. For a Frequency Division Duplexing (FDD) system, the feedback timing is n−4, that is, for the PDSCH received in the subframe n−4, the ACKnowledgement (ACK)/Non-ACKnowledgement (NACK) is fed back in the subframe n. For a Time Division Duplexing (TDD) system, the feedback timings are different for different TDD uplink and downlink configurations. For example, as shown in Table 1, for the PDSCH received in the subframe n−k, the ACK/NACK is fed back in the subframe n, wherein k set may include more than one element, which means that the PDSCHs in multiple downlink subframes need to perform the ACK/NACK feedbacks in the same uplink subframe n. The user equipment sorts the ACK/NACKs in the order of the scheduled downlink subframes, to obtain an ACK/NACK feedback information sequence including multiple bits. This sorting uses the same rule at the user equipment and base station sides. Therefore, when obtaining the ACK/NACK feedback information sequence, the base station can correctly determine which ACK/NACK feedback bit corresponds to the PDSCH in which scheduled subframe, thereby making the correct retransmission operation.

TABLE 1 in the TDD system, the downlink subframe index set K $\{k_0, k_1, \cdots k_{M-1}\}$ corresponding to the uplink subframes

| Uplink/ Downlink Config- uration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The case of k corresponding to each uplink subframe is given by taking a radio frame as an example in the above, wherein n−k<0 represents the downlink subframe in the previous radio frame.

With the development of the mobile communication service demand, the International Telecommunication Union (ITU), the 3rd Generation Partnership Project (3GPP) and other organizations all begin to research the new wireless communication system, e.g., 5 Generation New RAT (5G NR). In the 5G NR system, the user equipment may receive two PDSCHs simultaneously in one serving cell. These two PDSCHs may carry different Transport Blocks (TBs) information and may come from different Transmission Reception Points (TRPs). The PDSCHs from different TRPs use different beams for transmission. These two PDSCHs both need to correspond to the ACK/NACK feedback information, and the ACK/NACK feedback information of these two PDSCHs needs to be transmitted through the same uplink channel at the same time. This situation is not defined in the LTE system. There is an urgent need for a transmission scheme of performing the ACK/NACK feedback when at least two PDSCHs are received simultaneously on the same serving cell.

SUMMARY

The invention provides a transmission method, a device, a user equipment, a base station and a storage medium, so as to solve the problem in the prior art that the ACK/NACK feedback cannot be performed when the user equipment receives two PDSCHs simultaneously in the same serving cell.

The invention discloses a transmission method, which is applied to a user equipment and includes:
  receiving downlink transmissions;
  sorting ACK/NACK feedback information of the downlink transmissions according to Downlink Assignment Indexes (DAIs) corresponding to the downlink transmissions to obtain and transmit an ACK/NACK sequence to be fed back, wherein the DAIs cumulatively count the downlink transmissions at least in order of Transmission Reception Points (TRPs).

Further, the DAIs cumulatively count the downlink transmissions at least in order of TRPs, which includes: when there are downlink transmissions in at least two different downlink times in a same configured or activated serving cell/carrier/bandwidth part, that need to perform ACK/NACK feedbacks in a same uplink time, the DAIs cumulatively count the downlink transmissions in order of TRP first and time domain later.

Further, when there is a downlink shared channel without corresponding downlink control channel in at least one of the at least two downlink times, ACK/NACK of the downlink shared channel without corresponding downlink control channel is mapped to a predetermined position in an ACK/NACK sequence corresponding to the serving cell/carrier/bandwidth part.

Further, the predetermined position is a first X-bit positions or last X-bit positions in the ACK/NACK sequence, wherein X is the bit number of the ACK/NACK of the downlink shared channel without corresponding downlink control channel.

Further, the DAIs cumulatively count the downlink transmissions at least in order of TRPs, which includes: when the number of configured or activated serving cells/carriers/bandwidth parts is at least two, the DAIs cumulatively count the downlink transmissions in order of TRP first and frequency domain later; or when the number of configured or activated serving cells/carriers/bandwidth parts is at least two, the DAIs count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform ACK/NACK feedbacks in a same uplink time, the DAIs cumulatively count the downlink transmissions in order of TRP first, frequency domain later and time domain last.

Further, the sorting ACK/NACK feedback information of the downlink transmissions according to DAIs corresponding to the downlink transmissions, includes: assuming that a DAI value corresponding to one downlink transmission is DAI(k), then mapping ACK/NACK of the one downlink transmission to index positions C*DAI(k)-C to C*DAI(k)-1 in the ACK/NACK sequence, wherein it is assumed that the index positions start from 0 and C is the bit number of ACK/NACK feedback of one downlink transmission; or assuming that a DAI value corresponding to one downlink transmission is DAI(k), then mapping ACK/NACK of the one downlink transmission to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

Further, the TRP is represented as a beam group.

Further, the receiving downlink transmissions includes: obtaining beam group information; and receiving downlink transmissions according to the beam group information.

Further, a beam in the beam group is represented by any one or more combinations of: Quasi-Co-Location (QCL) relationship, a resources and/or port of a reference signal related to beam measurement, beam index and Beam Pair Linkage (BPL).

Further, the DAI contains A-bit information, wherein a same state of the A-bit information indicates one indication number or indicates a plurality of different indication numbers.

Further, the downlink transmission includes: a downlink shared channel with a corresponding downlink control channel, and/or a downlink control channel indicating downlink SRS resource release; wherein a DAI corresponding to the downlink transmission is: when the downlink transmission is a downlink shared channel with a corresponding downlink control channel, the DAI corresponding to the downlink transmission is a DAI in the downlink control channel; when the downlink transmission is a downlink control channel indicating downlink SRS resource release, the DAI corresponding to the downlink transmission is a DAI in the downlink control channel indicating downlink SRS resource release.

The invention discloses a transmission method, which is applied to a base station and includes: transmitting downlink transmissions, wherein DAIS corresponding to the downlink transmissions cumulatively count the downlink transmissions at least in order of TRPs; and receiving an ACK/NACK sequence, wherein ACK/NACK feedback information of the downlink transmissions is sorted in the ACK/NACK sequence according to the DAIs.

Further, DAIs corresponding to the downlink transmissions cumulatively count the downlink transmissions at least in order of TRPs, which includes: when there are downlink transmissions in at least two different downlink times in a same configured or activated serving cell/carrier/bandwidth part, that need to perform ACK/NACK feedbacks in a same uplink time, DAIs corresponding to the downlink transmissions cumulatively count the downlink transmissions in order of TRP first and time domain later.

Further, ACK/NACK feedback information of the downlink transmissions is sorted in the ACK/NACK sequence according to the DAIs, which includes: when there is a downlink shared channel without corresponding downlink control channel in at least one of the at least two downlink times, it is determined that ACK/NACK of the downlink shared channel without corresponding downlink control channel is mapped to a predetermined position in an ACK/NACK sequence corresponding to the serving cell/carrier/bandwidth part.

Further, the predetermined position is a first X-bit positions or last X-bit positions in the ACK/NACK sequence, wherein X is the bit number of the ACK/NACK of the downlink shared channel without corresponding downlink control channel.

Further, DAIs corresponding to the downlink transmissions cumulatively count the downlink transmissions at least in order of TRPs, which includes:

when the number of configured or activated serving cells/carriers/bandwidth parts is at least two, DAIs corresponding to the downlink transmissions cumulatively count the downlink transmissions in order of TRP first and frequency domain later; or when the number of configured or activated serving cells/carriers/bandwidth parts is at least two, DAIs corresponding to the downlink transmissions count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform ACK/NACK feedbacks in a same uplink time, DAIs corresponding to the downlink transmissions cumulatively count the downlink transmissions in order of TRP first, frequency domain later and time domain last.

Further, ACK/NACK feedback information of the downlink transmissions is sorted in the ACK/NACK sequence according to the DAIs, which includes: assuming that a DAI value corresponding to one downlink transmission is DAI (k), then determining that ACK/NACK of the one downlink transmission is mapped to index positions C*DAI(k)-C to C*DAI(k)-1 in the ACK/NACK sequence, wherein it is assumed that the index positions start from 0 and C is the bit number of ACK/NACK feedback of one downlink transmission; or assuming that a DAI value corresponding to one downlink transmission is DAI(k), then determining that ACK/NACK of the one downlink transmission is mapped to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

Further, the TRP is represented as a beam group.

Further, the transmitting downlink transmissions includes: determining a beam group and transmitting configuration information indicating the beam group to a user equipment; and transmitting downlink transmissions according to beam group information.

Further, a beam in the beam group is represented by any one or more combinations of: Quasi-Co-Location (QCL) relationship, a resource and/or port of a reference signal related to beam measurement, beam index and Beam Pair Linkage (BPL).

Further, the DAI contains A-bit information, wherein a same state of the A-bit information indicates one indication number or indicates a plurality of different indication numbers.

Further, the downlink transmission includes: a downlink shared channel with a corresponding downlink control channel, and/or a downlink control channel indicating downlink SRS resource release; wherein a DAI corresponding to the downlink transmission is: when the downlink transmission is a downlink shared channel with a corresponding downlink control channel, the DAI corresponding to the downlink transmission is a DAI in the downlink control channel; when the downlink transmission is a downlink control channel indicating downlink SRS resource release, the DAI corresponding to the downlink transmission is a DAI in the downlink control channel indicating downlink SRS resource release.

The invention discloses a transmission device, which is applied to a user equipment and includes: a receiving module configured to receive downlink transmissions; and a sorting and transmitting module configured to sort ACK/NACK feedback information of the downlink transmissions according to DAIS corresponding to the downlink transmissions to obtain and transmit an ACK/NACK sequence to be fed back, wherein the DAIS cumulatively count the downlink transmissions at least in order of TRPs.

The invention discloses a transmission device, which is applied to a base station and includes: a transmitting module configured to transmit downlink transmissions, wherein DAIS corresponding to the downlink transmissions cumulatively count the downlink transmissions at least in order of TRPs; and a receiving module configured to receive an ACK/NACK sequence, wherein ACK/NACK feedback information of the downlink transmissions is sorted in the ACK/NACK sequence according to the DAIS.

The invention discloses a user equipment including: a memory, a processor and a transceiver; the processor is configured to read programs in the memory and perform the process of: receiving downlink transmissions via the transceiver; and sorting ACK/NACK feedback information of the downlink transmissions according to DAIs corresponding to the downlink transmissions to obtain and transmit an ACK/NACK sequence to be fed back, wherein the DAIs cumulatively count the downlink transmissions at least in order of TRPs.

Further, the processor is configured to: when there are downlink transmissions in at least two different downlink times in a same configured or activated serving cell/carrier/bandwidth part, that need to perform ACK/NACK feedbacks in a same uplink time, the DAIs cumulatively count the downlink transmissions in order of TRP first and time domain later.

Further, the processor is configured to: when there is a downlink shared channel without corresponding downlink control channel in at least one of the at least two downlink times, map ACK/NACK of the downlink shared channel without corresponding downlink control channel to a predetermined position in an ACK/NACK sequence corresponding to the serving cell/carrier/bandwidth part.

Further, the predetermined position is a first X-bit positions or last X-bit positions in the ACK/NACK sequence, wherein X is the bit number of the ACK/NACK of the downlink shared channel without corresponding downlink control channel.

Further, the processor is configured to: when the number of configured or activated serving cells/carriers/bandwidth parts is at least two, the DAIs cumulatively count the downlink transmissions in order of TRP first and frequency domain later; or when the number of configured or activated serving cells/carriers/bandwidth parts is at least two, the DAIs count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform ACK/NACK feedbacks in a same uplink time, the DAIs cumulatively count the downlink transmissions in order of TRP first, frequency domain later and time domain last.

Further, the processor is configured to: assume that a DAI value corresponding to one downlink transmission is DAI(k), then map ACK/NACK of the one downlink transmission to index positions C*DAI(k)-C to C*DAI(k)-1 in the ACK/NACK sequence, wherein it is assumed that the index positions start from 0 and C is the bit number of ACK/NACK feedback of one downlink transmission; or assume that a DAI value corresponding to one downlink transmission is DAI(k), then map ACK/NACK of the one downlink transmission to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

Further, the TRP is represented as a beam group.

Further, the processor is configured to: obtain beam group information; and receive downlink transmissions via the transceiver according to the beam group information.

Further, a beam in the beam group is represented by any one or more combinations of: Quasi-Co-Location (QCL) relationship, a resources and/or port of a reference signal related to beam measurement, beam index and Beam Pair Linkage (BPL).

Further, the DAI contains A-bit information, wherein a same state of the A-bit information indicates one indication number or indicates a plurality of different indication numbers.

Further, the downlink transmission includes: a downlink shared channel with a corresponding downlink control channel, and/or a downlink control channel indicating downlink SRS resource release; wherein a DAI corresponding to the downlink transmission is: when the downlink transmission is a downlink shared channel with a corresponding downlink control channel, the DAI corresponding to the downlink transmission is a DAI in the downlink control channel; when the downlink transmission is a downlink control channel indicating downlink SRS resource release, the DAI corresponding to the downlink transmission is a DAI in the downlink control channel indicating downlink SRS resource release.

The invention discloses a base station including: a memory, a processor and a transceiver; the processor is configured to read programs in the memory and perform the process of: transmitting downlink transmissions via the transceiver, wherein DAIS corresponding to the downlink transmissions cumulatively count the downlink transmissions at least in order of TRPs; and receiving an ACK/NACK sequence, wherein ACK/NACK feedback information of the downlink transmissions is sorted in the ACK/NACK sequence according to the DAIS.

Further, the processor is configured to: when there are downlink transmissions in at least two different downlink times in a same configured or activated serving cell/carrier/bandwidth part, that need to perform ACK/NACK feedbacks in a same uplink time, DAIS corresponding to the downlink transmissions cumulatively count the downlink transmissions in order of TRP first and time domain later.

Further, the processor is configured to: when there is a downlink shared channel without corresponding downlink control channel in at least one of the at least two downlink times, determine that ACK/NACK of the downlink shared channel without corresponding downlink control channel is mapped to a predetermined position in an ACK/NACK sequence corresponding to the serving cell/carrier/bandwidth part.

Further, the predetermined position is a first X-bit positions or last X-bit positions in the ACK/NACK sequence, wherein X is the bit number of the ACK/NACK of the downlink shared channel without corresponding downlink control channel.

Further, the processor is configured to: when the number of configured or activated serving cells/carriers/bandwidth parts is at least two, DAIS corresponding to the downlink transmissions cumulatively count the downlink transmissions in order of TRP first and frequency domain later; or when the number of configured or activated serving cells/carriers/bandwidth parts is at least two, DAIs corresponding to the downlink transmissions count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform ACK/NACK feedbacks in a same uplink time, DAIs corresponding to the downlink transmissions cumulatively count the downlink transmissions in order of TRP first, frequency domain later and time domain last.

Further, the processor is configured to: assume that a DAI value corresponding to one downlink transmission is DAI (k), then determine that ACK/NACK of the one downlink transmission is mapped to index positions C*DAI(k)-C to C*DAI(k)-1 in the ACK/NACK sequence, wherein it is assumed that the index positions start from 0 and C is the bit number of ACK/NACK feedback of one downlink transmission; or assume that a DAI value corresponding to one downlink transmission is DAI(k), then determine that ACK/NACK of the one downlink transmission is mapped to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

Further, the TRP is represented as a beam group.

Further, the processor is configured to: determine a beam group and transmit configuration information indicating the beam group to a user equipment via the transceiver; and transmit downlink transmissions via the transceiver according to beam group information.

Further, a beam in the beam group is represented by any one or more combinations of: Quasi-Co-Location (QCL) relationship, a resource and/or port of a reference signal related to beam measurement, beam index and Beam Pair Linkage (BPL).

Further, the DAI contains A-bit information, wherein a same state of the A-bit information indicates one indication number or indicates a plurality of different indication numbers.

Further, the downlink transmission includes: a downlink shared channel with a corresponding downlink control channel, and/or a downlink control channel indicating downlink SRS resource release; wherein a DAI corresponding to the downlink transmission is: when the downlink transmission is a downlink shared channel with a corresponding downlink control channel, the DAI corresponding to the downlink transmission is a DAI in the downlink control channel; when the downlink transmission is a downlink control channel indicating downlink SRS resource release, the DAI corresponding to the downlink transmission is a DAI in the downlink control channel indicating downlink SRS resource release.

The invention discloses a computer readable storage medium storing computer programs that, when executed on an electronic device, cause the electronic device to perform any method described above.

The invention discloses a computer readable storage medium storing computer programs that, when executed on an electronic device, cause the electronic device to perform any method described above.

The invention discloses a transmission method, a device, a user equipment, a base station and a storage medium. The method includes: the user equipment receives the downlink transmissions, and sorts the ACK/NACK feedback information of the downlink transmissions according to the DAIS corresponding to the downlink transmissions to obtain and transmit the ACK/NACK sequence to be fed back, wherein the DAIS cumulatively count the downlink transmissions at least in order of TRPs. In the embodiments of the present invention, the user equipment receives the downlink transmissions, and sorts the ACK/NACK feedback information of the downlink transmissions according to the DAIs corresponding to the downlink transmissions to obtain and transmit the ACK/NACK sequence to be fed back, wherein the DAIs cumulatively count the downlink transmissions at least in order of TRPs, so that the base station can also parse the ACK/NACK sequence according to the DAIs corresponding to the downlink transmissions after receiving the ACK/NACK sequence fed back by the user equipment. Provided is a transmission scheme capable of performing the ACK/NACK feedback when the user equipment receives two PDSCHs simultaneously in the same serving cell.

BRIEF DESCRIPTION OF THE DRAWINGS

In order to illustrate the embodiments of the invention or the technical solutions in the prior art more clearly, the accompanying figures which need to be used in describing the embodiments or the prior art will be introduced below briefly. Obviously the accompanying figures described below are merely some embodiments of the invention, and other accompanying figures can also be obtained by those ordinary skilled in the art according to these accompanying figures without creative labor.

DETAILED DESCRIPTION

In order to make the objects, technical solutions and advantages of the invention clearer, the invention will be further illustrated below in details with reference to the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

First Embodiment

Figure 1:
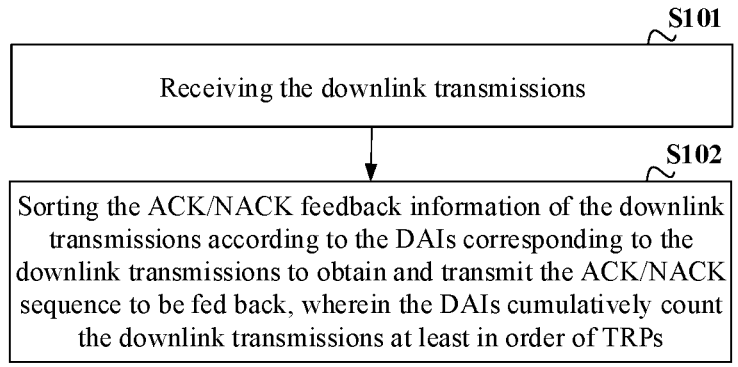
FIG. 1 is a schematic diagram of a transmission process according to an embodiment of the invention.

FIG. 1 is a schematic diagram of a transmission process according to an embodiment of the invention. This process includes the following steps.

S101: receiving the downlink transmissions.

S102: sorting the ACK/NACK feedback information of the downlink transmissions according to the Downlink Assignment Indexes (DAIs) corresponding to the downlink transmissions to obtain and transmit the ACK/NACK sequence to be fed back, wherein the DAIs cumulatively count the downlink transmissions at least in order of Transmission Reception Points (TRPs).

The transmission method according to the embodiment of the invention is applied to a user equipment, where the user equipment may be a device such as a mobile phone or a tablet computer.

Specifically, in an embodiment of the invention, the downlink transmission includes: a downlink shared channel with a corresponding downlink control channel, and/or a downlink control channel indicating downlink Sounding Reference Signal (SRS) resource release. The DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

The ACK/NACK feedback information corresponding to the downlink transmission includes: the ACK/NACK feedback information of the downlink shared channel scheduled by the downlink control channel, and/or the ACK/NACK feedback information of the downlink control channel indicating the downlink SRS resource release. In the embodiment of the invention, it is the prior art to determine the ACK/NACK feedback information corresponding to the downlink transmission, and the details will not be described again.

The user equipment receives the downlink transmissions transmitted by the base station, determines the ACK/NACK feedback information corresponding to the downlink transmissions, and sorts the ACK/NACKs corresponding to the downlink transmissions according to the indication numbers of DAIS in the downlink transmissions, to obtain the ACK/NACK sequence to be fed back and transmit it to the base station.

In the embodiments of the invention, the user equipment receives the downlink transmissions, and sorts the ACK/NACK feedback information of the downlink transmissions according to the DAIS corresponding to the downlink transmissions, to obtain and transmit the ACK/NACK sequence to be fed back, wherein the DAIS cumulatively count the downlink transmissions at least in order of TRPs, so that the base station can also parse the ACK/NACK sequence according to the DAIS corresponding to the downlink transmissions after receiving the ACK/NACK sequence fed back by the user equipment.

The DAI corresponding to the downlink transmission received by the user equipment indicates the total number of downlink transmissions accumulated up to the current downlink time.

Specifically, the DAIs cumulatively count the downlink transmissions at least in order of Transmission Reception Points (TRPs), which includes: when there are downlink transmissions in at least two different downlink times in the same configured or activated serving cell/carrier/bandwidth part (BWP), that need to perform the ACK/NACK feedbacks in the same uplink time, the DAIs cumulatively count the downlink transmissions in order of TRP first and time domain later.

That is, when there are downlink transmissions in at least two different downlink times in the same configured or activated serving cell/carrier/bandwidth part, that need to perform the ACK/NACK feedbacks in the same uplink time, the DAIs cumulatively count according to the TRPs in the same downlink time at first and then cumulatively count according to the TRPs in different downlink time. The time domain refers to different downlink time in the embodiments of the invention.

When there is a downlink shared channel without corresponding downlink control channel in at least one of the at least two downlink times, the ACK/NACK of the downlink shared channel without corresponding downlink control channel is mapped to a predetermined position in the ACK/NACK sequence corresponding to the serving cell/carrier/bandwidth part.

The predetermined position is the first X-bit positions or last X-bit positions in the ACK/NACK sequence, wherein X is the bit number of the ACK/NACK of the downlink shared channel without corresponding downlink control channel. That is, the predetermined position may be the first position or the last position.

When the number N of configured or activated serving cells/carriers/bandwidth parts is greater than 1, the DAIs cumulatively count the downlink transmissions at least in order of Transmission Reception Points (TRPs), which includes one of:

when the number of configured or activated serving cells/carriers/bandwidth parts is at least two, the DAIs cumulatively count the downlink transmissions in order of TRP first and frequency domain later;

when the number of configured or activated serving cells/carriers/bandwidth parts is at least two, the DAIs count independently on different serving cells/carriers/bandwidth parts, and cumulatively count the downlink transmissions in the serving cell/carrier/bandwidth part in order of TRPs corresponding to each serving cell/carrier/bandwidth part;

when the number of configured or activated serving cells/carriers/bandwidth parts is at least two and there are downlink transmissions in at least two different downlink times that need to perform the ACK/NACK feedbacks in the same uplink time, the DAIs cumulatively count the downlink transmissions in order of TRP first, frequency domain later and time domain last.

When the number of configured or activated serving cells/carriers/bandwidth parts is at least two, the DAIs cumulatively count the downlink transmissions in order of TRP first and frequency domain later. Specifically, it is possible to perform the ACK/NACK feedback in one uplink time for only one downlink time in the time domain, so there is no cumulative count in the time domain and the cumulative count is performed only on the TRPs and frequency domain. Specifically, it is possible to perform the cumulative count in order of multiple TRPs corresponding to one serving cell/carrier/bandwidth part in this serving cell/carrier/bandwidth part at first, and then continue to cumulatively count in the next serving cell/carrier/bandwidth part again, and so on.

When the number of configured or activated serving cells/carriers/bandwidth parts is at least two, and there are downlink transmissions in at least two different downlink times that need to perform the ACK/NACK feedbacks in the same uplink time, the DAIs cumulatively count the downlink transmissions in order of TRP first, frequency domain later and time domain last. That is, in one downlink time and in one serving cell/carrier/bandwidth part, the DAIs cumulatively count in order of multiple TRPs corresponding to this serving cell/carrier/bandwidth part, then again on the next serving cell/carrier/bandwidth part in this downlink time until all the serving cells/carriers/bandwidth parts have been accumulated, and then the above process continues to be repeated for accumulation at the next downlink time until the last downlink time.

When the number of configured or activated serving cells/carriers/bandwidth parts is at least two, the DAIs count independently in different serving cells/carriers/bandwidth parts. Specifically, when counting, the various above methods may be adopted. That is, when there are only downlink transmissions in one downlink time that need to perform the ACK/NACK feedbacks in one uplink time in one serving cell/carrier/bandwidth part, the DAIs cumulatively count in order of TRPs, i.e., cumulatively count in order of TRPs in multiple TRPs corresponding to the downlink transmissions in this downlink time; when there are downlink transmissions in at least two different downlink times in one serving cell/carrier/bandwidth part, that need to perform the ACK/NACK feedbacks in the same uplink time, the DAIs cumulatively count the downlink transmissions in order of TRP first and time domain later. When there is a downlink shared channel without corresponding downlink control channel in at least one of the at least two downlink times, the ACK/NACK of the downlink shared channel without corresponding downlink control channel is mapped to a predetermined position in the ACK/NACK sequence corresponding to the serving cell/carrier/bandwidth part. The predetermined position is the first X-bit positions or last X-bit positions in the ACK/NACK sequence, wherein X is the bit number of the ACK/NACK of the downlink shared channel without corresponding downlink control channel. Then, DAIs count independently in the next serving cell/carrier/bandwidth part using the above embodiment. That is, the above embodiment is used for independent DAIs counting in each serving cell/carrier/bandwidth part.

In an embodiment of the invention, the DAI contains A-bit information, wherein the same state of the A-bit information indicates a plurality of different indication numbers. When the A-bit information state indicates a plurality of different indication numbers, the X values satisfying $X \bmod 2^A = B$ correspond to the same A-bit information state, and the binary value of the A-bit information state+1=B, wherein X is the indication number. In an embodiment of the invention, the bit number of A may be 1, 2, 3, etc., and may be specifically set according to the number required for counting.

When A=1 bit, the same state and indication number of DAI are as shown in Table 2:

TABLE 2

| DAI state | Indication number: Number of PDSCHs with corresponding PDCCHs and PDCCHs indicating downlink SRS resource release |
|---|---|
| 0 | 1 or 3 or 5 . . . (i.e., X value satisfying $X \bmod 2^A = 1$) |
| 1 | 2 or 4 or 6 . . . (i.e., X value satisfying $X \bmod 2^A = 0$) |

According to Table 2, the DAI state is 0 or 1. When the DAI state is 0, the indication numbers are 1, 3, 5, etc. respectively, that is, the X values satisfying $X \bmod 2^A = 1$ are indicated; when the DAI state is 1, the indication numbers are 2, 4, 6, etc. respectively, that is, the X values satisfying $X \bmod 2^A = 0$ are indicated.

When A=2 bits, the same state and indication number of DAI are as shown in Table 3:

TABLE 3

| DAI state | Indication number: Number of PDSCHs with corresponding PDCCHs and PDCCHs indicating downlink SRS resource release |
|---|---|
| 00 | 1 or 5 or 9 . . . (i.e., X value satisfying $X \bmod 2^A = 1$) |
| 01 | 2 or 6 or 10 . . . (i.e., X value satisfying $X \bmod 2^A = 2$) |
| 10 | 3 or 7 or 11 . . . (i.e., X value satisfying $X \bmod 2^A = 3$) |
| 11 | 4 or 8 or 12 . . . (i.e., X value satisfying $X \bmod 2^A = 0$) |

According to Table 3, the DAI state includes 00, 01, 10, and 11. When the DAI state is 00, the indication numbers are 1, 5, 9, etc. respectively, that is, X values satisfying $X \bmod 2^A = 1$ are indicated; when the DAI state is 01, the indication numbers are 2, 6, 10, etc. respectively, that is, X value satisfying $X \bmod 2^A = 2$ are indicated; when the DAI state is 10, the indication numbers are 3, 7, 11, etc. respectively, that is, X values satisfying $X \bmod 2^A = 3$ are indicated; when the DAI state is 11, the indication numbers are 4, 8, 12, etc. respectively, that is, X values satisfying $X \bmod 2^A = 0$ are indicated.

When A=3 bits, the same state and indication number of DAI are as shown in Table 4:

TABLE 4

| DAI state | Indication number: Number of PDSCHs with corresponding PDCCHs and PDCCHs indicating downlink SRS resource release |
|---|---|
| 000 | 1 or 9 . . . (i.e., X value satisfying $X \bmod 2^A = 1$) |
| 001 | 2 or 10 . . . (i.e., X value satisfying $X \bmod 2^A = 2$) |
| 010 | 3 or 11 . . . (i.e., X value satisfying $X \bmod 2^A = 3$) |
| 011 | 4 or 12 . . . (i.e., X value satisfying $X \bmod 2^A = 4$) |
| 100 | 5 or 13 . . . (i.e., X value satisfying $X \bmod 2^A = 5$) |
| 101 | 6 or 14 . . . (i.e., X value satisfying $X \bmod 2^A = 6$) |
| 110 | 7 or 15 . . . (i.e., X value satisfying $X \bmod 2^A = 7$) |
| 111 | 8 or 16 . . . (i.e., X value satisfying $X \bmod 2^A = 0$) |

According to Table 4, the DAI state includes 000, 001, 010, 011, 100, 101, 110, 111. When the DAI state is 000, the indication numbers are 1, 9, etc. respectively, that is, X values satisfying $X \bmod 2^A = 1$ are indicated; when the DAI state is 001, the indication numbers are 2, 10, etc. respectively, that is, the X values satisfying $X \bmod 2^A = 2$ are indicated; when the DAI state is 010, the indication numbers are 3, 11, etc. respectively, that is, the X values satisfying $X \bmod 2^A = 3$ are indicated; when the DAI state is 011, the indication numbers are 4, 12, etc. respectively, that is, the X values satisfying $X \bmod 2^A = 4$ are indicated; when the DAI state is 100, the indication numbers are 5, 13, etc. respectively, that is, the X values satisfying $X \bmod 2^A = 5$ are indicated; when the DAI state is 101, the indication numbers are 6, 14, etc. respectively, that is, the X values satisfying $X \bmod 2^A = 6$ are indicated; when the DAI state is 110, the indication numbers are 7, 15, etc. respectively, that is, the X values satisfying $X \bmod 2^A = 7$ are indicated; when the DAI state is 111, the indication numbers are 8, 16, etc. respectively, that is, the X values satisfying $X \bmod 2^A = 0$ are indicated. The base station determines the indication number of the DAI according to the actual scheduling situation and then determines the DAI state corresponding to this indication number, where the DAI state is the binary representation of the A-bit DAI, and the DAI in the downlink control channel is set to the corresponding DAI state. The user equipment side reads the DAI domain in the received downlink control channel and determines the corresponding indication number according to the DAI state in the DAI domain. When one DAI state corresponds to multiple indication numbers, the user equipment may judge the indication number corresponding to the DAI state according to the actual receiving situation. For example, the DAI state obtained by the user equipment is "01", then if the user equipment has received no more than 2 downlink transmissions until the downlink transmission corresponding to the DAI (including the downlink transmission corresponding to the DAI), the user equipment may determine that the indication number corresponding to the DAI state is 2; if the user equipment has received more than 2 and no more than 6 downlink transmissions until the downlink transmission corresponding to the DAI (including the downlink transmission corresponding to the DAI), the user equipment may determine that the indication number corresponding to the DAI state is 6, and so on.

Further, the sorting the ACK/NACK feedback information of the downlink transmissions according to the DAIS corresponding to the downlink transmissions, includes: assuming that the DAI value corresponding to one downlink transmission is DAI(k), then mapping the ACK/NACK of the one downlink transmission to the index positions C*DAI(k)-C to C*DAI(k)-1 in the ACK/NACK sequence, wherein it is assumed that the index positions start from 0, and C is the bit number of the ACK/NACK feedback of one downlink transmission; or, assuming that the DAI value corresponding to one downlink transmission is DAI(k), then mapping the ACK/NACK of the one downlink transmission to the index position $$\sum_{i=1}^{DAI(k)-1} C_i - C_{DAI(k)} \text{ to } \sum_{i=1}^{DAI(k)-1} C_i - 1,$$

wherein it is assumed that the index position starts from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Specifically, when the index position in the ACK/NACK sequence to which the ACK/NACK of the downlink transmission is mapped is determined according to C*DAI(k)-C to C*DAI(k)-1, and when C is 1, the index positions C*DAI(k)-C and C*DAI(k)-1 overlap, that is, they are a same position, and it may be written as mapping to the index position C*DAI(k)-1. When the index position in the ACK/NACK sequence to which the ACK/NACK of the downlink transmission is mapped is determined according to $$\sum_{i=1}^{DAI(k)-1} C_i - C_{DAI(k)} \text{ to } \sum_{i=1}^{DAI(k)-1} C_i - 1$$

and when $C_{DAI(k)}$ is 1, the index positions $$\sum_{i=1}^{DAI(k)-1} C_i - C_{DAI(k)} \text{ and } \sum_{i=1}^{DAI(k)-1} C_i - 1$$

overlap, that is, they are a same position, and it may be written as mapping to the index position $$\sum_{i=1}^{DAI(k)-1} C_i - 1.$$

In an embodiment of the invention, C is related to factors such as the number of transmitted TBs, whether to use the CBG transmission and the number of divided CBGs, and whether to use the spatial bundling.

Further, in an embodiment of the invention, the TRP may be represented as a beam group, different TRPs correspond to different beam groups, and different beam groups contain different beams. That is, the user equipment may implicitly distinguish the TRP corresponding to one downlink transmission according to the beam used by the downlink transmission coming from which beam group. In this process, the TRP may be directly replaced by the beam group. Then, for the user equipment that supports the reception of the downlink transmissions of different TRPs in the same time, which is equivalent to configuring multiple beam groups for the user equipment, and the user equipment may simultaneously use the beams belonging to different beam groups to receive the downlink transmissions.

In order to ensure that the user equipment acquires the downlink transmissions accurately, receiving the downlink transmissions includes: obtaining the beam group information, and receiving the downlink transmissions according to the beam group information.

The user equipment receives the configuration information notified by the base station, and obtains the beam group information according to the configuration information.

In an embodiment of the invention, a beam in the beam group is represented by any one or more combinations of: Quasi-Co-Location (QCL) relationship, resource(s) and/or port(s) of the reference signal(s) related to beam measurement, beam index and Beam Pair Linkage (BPL).

The specific performance of the beam group is illustrated below in different cases.

The beam may be represented as the QCL relationship. In this way, the configuration of the beam group is represented as the grouping configuration of the QCL, and the number of beam groups is represented as the number of QCL groups, that is, the QCL relationship is divided into multiple groups to obtain the number of groups. Note: the antenna port of the DMRS of the downlink transmission and the notified port(s) on the resources of the reference signal related to one beam measurement are of QCL, or the antenna port of the DMRS of the downlink transmission and one notified port on the resources of the reference signal related to one beam measurement are of QCL.

For example, the resources or the resources+ports of multiple reference signals are pre-configured. In the case of different resources or different combinations of resources and ports, different transmitting-receiving combination results obtained by measuring/training are recorded as the beams on the corresponding resource or the corresponding resource and port. When a user equipment is notified of a QCL relationship, i.e., notified of the fact that the DMRS of one channel transmission and the notified port of the reference signal resource have the QCL relationship, that is, there is a need to use the beam corresponding to the resource or the resource plus port to perform the transmission, i.e., use the recorded encoding matrix corresponding to receiving or transmitting to perform the transmission.

Alternatively, the beam may also be represented as the resource(s) and/or port(s) of the reference signal related to beam measurement; in this way, the configuration of the beam group may be represented as the grouping configuration of the resources and/or ports of the reference signal, and the number of beam groups may be represented as the number of resource and/or port groups of the reference signal, that is, the resources and/or ports of the reference signal are divided into multiple groups to obtain the number of groups. Note: in this way, all ports on the resources of one reference signal correspond to one beam, or one port on the resources of one reference signal corresponds to one beam, and different ports may correspond to different beams.

For example, the resources or the resources+ports of multiple reference signals are pre-configured. In the case of different resources or different combinations of resources and ports, different transmitting-receiving combination results obtained by measuring/training are recorded as the beams on the corresponding resources or the corresponding resources and ports. When a user equipment is notified of the resource or the resource+port of one reference signal, i.e., notified of the fact that the DMRS of one channel transmission and the notified port of the reference signal resource have the QCL relationship, that is, there is a need to use the beam corresponding to the resource or the resource+port to perform the transmission, i.e., use the recorded encoding matrix corresponding to receiving or transmitting to perform the transmission.

Alternatively, the beam may be represented as a beam index. In this way, the configuration of the beam group is represented as the grouping configuration of the beam indexes, and the number of beam groups is represented as the number of beam index groups, that is, the beam indexes are divided into multiple groups to obtain the number of groups. Note: it means that the beam is directly defined in the standard, and the QCL relationship corresponding to the beam may be determined by the beam index. For example, different transmitting-receiving combinations are obtained by measuring/training on the configured resources or resources and corresponding ports of multiple reference signals. For example, the combination results of the used precoding matrices are recorded, and the transmitting-receiving combinations may be directly defined as different beams, or the receptions in the transmitting-receiving combinations are defined as different beams, which are represented by the beam indexes.

Further alternatively, the beam may also be represented as BPL. In this way, the configuration of the beam group may be represented as the grouping configuration of the BPLs, and the number of beam groups may be represented as the number of BPL groups, that is, the BPLs are divided into multiple groups to obtain the number of groups. Note: the pairing relationship between the beam used by the transmitter to transmit one downlink transmission and the beam used by the receiver to receive this downlink transmission; the beam used by the user equipment to receive the downlink transmission may be determined by the BPL; note: when a TRP uses a transmitting beam to transmit one downlink transmission, such as PDCCH or PDSCH or downlink reference information (such as CSI-RS, etc.), the user equipment receives the downlink transmission using a different receiving beam, that is, there is a pairing relationship between one transmitting beam and one receiving beam, which is called BPL. The BPL may be obtained by beam training. For example, different transmitting-receiving combinations are obtained by measuring/training on the configured resources or resources and corresponding ports of multiple reference signals, that is, the combination results of the used precoding matrices are recorded and defined as different BPLs.

When the beams and the beam groups are configured and indicated, the base station may generally pre-configure the beams corresponding to one or more Physical Downlink Control Channels (PDCCHs) for the user equipment, so that the user equipment detects the PDCCHs. The beam may be embodied by notifying the user equipment that there is the Quasi-Co-Location (QCL) relationship between the Demodulation Reference Signal (DMRS) port of the downlink channel and different CSI-RS configurations, wherein the CSI-RS configuration may be port, resource or the like for example. This QCL relationship means that the beam used by the DMRS port of the downlink transmission is the same as the beam corresponding to the corresponding reference signal configuration. The so-called same or identical beam means that the used precoding modes are the same. Therefore, when multiple QCL relationships are defined in advance, one or more of the QCL relationships may be notified directly to the user equipment, and the user equipment may determine the candidate beam set corresponding to receiving the downlink transmission through the QCL relationship(s); of course, it is also possible to achieve the purpose of notifying the beam used by the user equipment directly by notifying a certain CSI-RS configuration, for example, it is possible to notify a certain resource or notify a certain port on a certain resource.

The beam may also be embodied by the BPL, and at this time, the user equipment may be pre-configured with a plurality of BPLs. When the user equipment is notified of the index of one of the BPLs, the user equipment may determine the corresponding BPL according to the notified BPL index, and determine the used beam according to the sending and receiving beam pair defined in the BPL.

For the above two modes, there is no need to define the beam, while the meaning of the beam is implicitly embodied by other definition mode.

Of course, the beam may also be embodied directly by the beam index, and in this way, a plurality of beams are pre-configured or pre-defined for the user equipment, and the user equipment may determine the used beam according to the notified beam index. When there are multiple beams, different beams may correspond to different TRPs, the beams are divided into different groups, and the beam groups may be configured in the beam form described above. Different beam groups may implicitly express different TRPs, that is, the beams in a beam group is used for transmission, which means the transmission to and from a certain TRP.

Second Embodiment

For the base station side, the transmission method includes:

transmitting the downlink transmissions, wherein the DAIs corresponding to the downlink transmissions cumulatively count the downlink transmissions at least in order of TRPs; and receiving the ACK/NACK sequence, wherein the ACK/NACK feedback information of the downlink transmissions is sorted in the ACK/NACK sequence according to the DAIs.

The process in which the DAIs corresponding to the downlink transmissions cumulatively count the downlink transmissions at least in order of TRPs is the same as the counting process of the first embodiment at the user equipment side described above, and will not be repeated here.

Furthermore, the process in which the ACK/NACK feedback information of the downlink transmissions is sorted in the ACK/NACK sequence according to the DAIs is also the same as the corresponding process of the first embodiment at the user equipment side, and will not be repeated here.

In addition, the specific representation of the beam is also described correspondingly with reference to the first embodiment.

In the embodiment of the invention, the base station includes any receiving node, e.g., a TRP, a traditional base station, a relay node, or the like.

The transmission process of the embodiment of the invention will be described below in details by specific embodiments.

Third Embodiment

Firstly, it is assumed that the user equipment is configured with only one serving cell or carrier or bandwidth part. Take one serving cell as an example: it is assumed that there are two TRPs in the serving cell and the TRP is embodied by the beam group, and it is assumed that the beam is embodied by the CSI-RS resource (or resource+port), then: it is assumed that 6 CSI-RS resources are configured. Of course, 6 CSI-RS resources+ports are also possible.

It is assumed that 6 CSI-RS resources are configured, then it is assumed that there are multiple ports on each CSI-RS resource, then the ports are of QCL, that is, the same precoding matrix is used, that is, the same beam is used. It is assumed that 6 CSI-RS resources+ports are configured, for example, there are 2 ports on each CSI-RS, and then 6 CSI resource+port combinations can be obtained by configuring 3 CSI-RS resources, such as port 1 of CSI-RS resource 1, port 2 of CSI-RS resource 1, port 1 of CSI-RS resource 2, port 2 of CSI-RS resource 2, port 1 of CSI-RS resource 3, and port 2 of CSI-RS resource 3.

Each CSI-RS resource corresponds to a beam or a group of beams, i.e., precoding matrix, after beam training. For example, CSI-RS resource 1 corresponds to beam1, CSI-RS resource 2 corresponds to beam2, CSI-RS resource 3 corresponds to beam3, and CSI-RS resource 4 corresponds to beam4, CSI-RS resource 5 corresponds to beam5, and CSI-RS resource 6 corresponds to beam6. The user equipment may be implicitly notified of the QCL relationship between the DMRS of the downlink transmission and one CSI-RS resource by notifying the user equipment of one CSI-RS resource number, so that the user equipment obtain the beam corresponding to the downlink transmission. For example: notifying the user equipment of the CSI-RS resource 1 is equivalent to notifying that there is QCL relationship between the DMRS of the downlink transmission and the CSI-RS resource 1, which means that the user equipment is notified that the downlink transmission uses the beam1.

6 CSI-RS resources are divided into 2 beam groups, for example, the beam group 1 is {CSI-RS resource 1, CSI-RS resource 2, CSI-RS resource 3} and beam group 2 is {CSI-RS resource 4, CSI-RS resource 5, CSI-RS resource 6}, then the beam group 1 corresponds to beam1, beam2, beam3 and accordingly corresponds to TRP1, and the beam group 2 corresponds to beam4, beam5, beam6 and accordingly corresponds to TRP2. The correspondence between the beam groups 1 and 2 and TRPs is invisible to the user equipment, that is, this part of information may be undefined in the protocol and implemented by the base station itself. When the user equipment is configured with multiple beam groups, then the user equipment may simultaneously receive, in the same downlink time, the transmissions using the beams in different beam groups, i.e., the PDSCH transmissions from different TRPs.

It is assumed that the user equipment can only receive one downlink transmission on multiple beams in a group in one downlink time, but can receive one downlink transmission on each beam in different groups in the same downlink time. When one uplink time only corresponds to the ACK/NACK feedback information of one downlink time.

The specific transmission process includes the followings.

Base Station Side

In the downlink time 1, the beam1 in the beam group 1 is used to transmit one PDCCH1, the PDCCH1 schedules one PDSCH1 which uses one beam in the group 1, wherein the scheduled PDSCH1 may also uses the beam1, and of course, may also uses another beam (e.g., beam2) in the beam group 1. In the following embodiments, the beam used by the PDSCH scheduled by the PDCCH may be the same as the beam used by the PDCCH or may be another beam in the same beam group as the beam used by the PDCCH, and the details will not be described again. In addition, the beam1 may represent a combination of transmitting and receiving beams, or a user equipment receiving beam. Whether it is a combination or a receiving beam, the user equipment only needs to determine the receiving beam. The following embodiments are the same and will not be described again.

Figure 2:
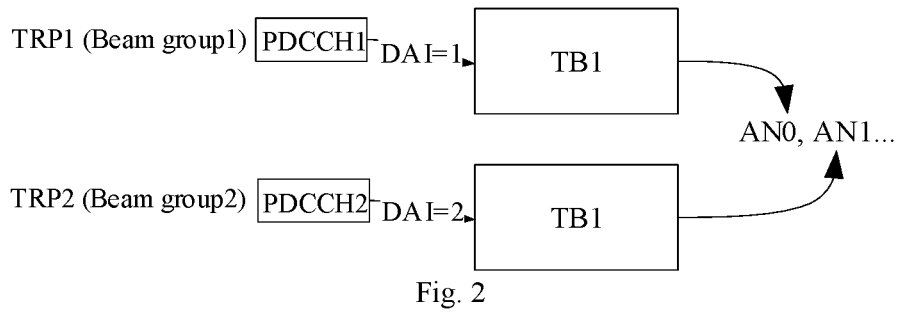
FIG. 2 is a schematic diagram of DAI in the transmission process according to an embodiment of the invention.
Figure 3:
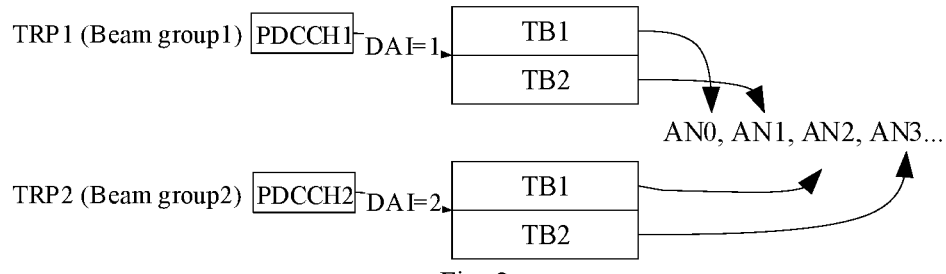
FIG. 3 is a schematic diagram of DAI in the transmission process according to an embodiment of the invention.

The PDCCH1 contains the 1-bit DAI set to "0", and the indication number thereof is "1" according to Table 1, which indicates that this is the first scheduled downlink transmission; at the same time, the beam4 in the beam group 2 is used to transmit one PDCCH2, the PDCCH2 schedules one PDSCH2 which uses one beam in the beam group 2, where the PDCCH2 contains the 1-bit DAI set to "1", and the indication number thereof is "2" according to Table 1, which indicates that this is the second scheduled downlink transmission or 2 downlink transmissions have been scheduled cumulatively up to the current position. The above scheduling process is shown in FIG. 2 and FIG. 3.

The user equipment detects the PDCCH in the downlink time 1, and the beam set used for detecting the PDCCH may be a pre-configured subset of the beams in the above beam group, e.g., {beam1, beam4}. The base station may implement the notification of the beam by notifying the corresponding CSI-RS resource. If the base station does not notify the beam subset, it is the complete set of the above beam group, i.e., {beam1~beam 6}. The detection processes in the following embodiments are the same and will not be described again.

User Equipment Side

When the user equipment detects the PDCCH1 using the beam1 and the PDCCH2 using the beam4, the user equipment further receives the corresponding PDSCH1 and PDSCH2 according to the scheduling information in the PDCCHs, generates the ACK/NACK feedback information for the PDSCH1 and PDSCH2, and sorts the ACK/NACKs according to the DAIS in the PDCCH1 and PDCCH2.

When one PDSCH corresponds to one ACK/NACK feedback information, the 1-bit ACK/NACK corresponding to the PDSCH1 is mapped to the first position (i.e., position with the position index being 0 when starting from 0) of the ACK/NACK sequence, and the 1-bit ACK/NACK corresponding to the PDSCH2 is mapped to the second position (i.e., position with the position index being 1 when starting from 0) of the ACK/NACK sequence. As shown in FIG. 2, the ANi sequence is the ACK/NACK sequence to be fed back. The bit number of the ACK/NACK sequence to be fed back may be dynamically notified by the indication field in the DCI, or may be semi-statically fixed. For example, the ACK/NACK sequence is fixed to 2 bits, the PDSCH1 corresponds to ACK, and the PDSCH2 corresponds to NACK, so the ACK/NACK sequence to be fed back is {ACK, NACK}.

The user equipment transmits the above 2-bit information on the PUCCH and/or PUSCH in the feedback time, for feeding back the ACK/NACK, corresponding to the downlink time 1.

When one PDSCH corresponds to two ACK/NACK feedback information, the 2-bit ACK/NACK corresponding to the PDSCH1 is mapped to the first and second positions (i.e., positions with the position indexes being 0 and 1 when starting from 0) of the ACK/NACK sequence, and the 2-bit ACK/NACK corresponding to the PDSCH2 is mapped to the third and fourth positions (i.e., positions with the position indexes being 2 and 3 when starting from 0) of the ACK/NACK sequence. As shown in FIG. 3, the ANi sequence is the ACK/NACK sequence to be fed back. The bit number of the ACK/NACK sequence to be fed back may be dynamically notified by the indication field in the DCI, or may be semi-statically fixed. For example, it is assumed the ACK/NACK sequence is fixed to 4 bits, and it is assumed that the PDSCH1 corresponds to ACK, ACK, and the PDSCH2 corresponds to NACK, NACK, then the ACK/NACK sequence to be fed back is {ACK, ACK, NACK, NACK}.

The user equipment transmits the above 4-bit information on the PUCCH and/or PUSCH in the feedback time, for feeding back the ACK/NACK, corresponding to the downlink time 1.

The base station receives the above 2-bit or 4-bit information on the PUCCH and/or PUSCH in the feedback time for feeding back the ACK/NACK corresponding to the downlink time 1, and parses according to the same sorting process at the user equipment side described above to thereby determine whether the retransmission is required. For example, in the case of 2 bits, the first feedback information bit ACK corresponds to the PDSCH1, so the PDSCH1 does not need to be retransmitted, and the second feedback information bit NACK corresponds to the PDSCH2, so the PDSCH2 needs to be retransmitted.

When the base station receives the 4-bit information, the first and second feedback information bits ACK and ACK correspond to the PDSCH1, so the PDSCH1 does not need to be retransmitted. For example, they correspond to two TBs of PDSCH1, or if the PDSCH1 is one TB but divided into two CBGs, they corresponds to each CBG respectively. The third and fourth feedback information bits NACK and NACK correspond to the PDSCH2, so the PDSCH2 needs to be retransmitted.

Fourth Embodiment

On the basis of the above embodiments, when there are downlink transmissions in at least two different downlink times that need to perform the ACK/NACK feedbacks in the same uplink time, one uplink time corresponding to the ACK/NACK feedback information of three downlink time is taken as an example for illustration.

Base Station Side

The base station transmits one PDCCH1 by using the beam1 in the beam group 1 in the downlink time 1, where the PDCCH1 schedules one PDSCH1 using one beam in the beam group 1, the PDCCH1 contains the 2-bit DAI set to "00", and the indication number thereof is "1" according to Table 2, which indicates that this is the first scheduled downlink transmission; at the same time, the beam4 in the beam group 2 is used to transmit one PDCCH2 which schedules one PDSCH2 using one beam in the beam group 2, where the PDCCH2 contains the 2-bit DAI set to "01", and the indication number thereof is "2" according to Table 2, which indicates that this is the second scheduled downlink transmission or 2 downlink transmissions have been scheduled cumulatively up to the current position.

There is no scheduling in the downlink time 2.

In the downlink time 3, the beam1 in the beam group 1 is used to transmit one PDCCH3 which schedules one PDSCH3 using one beam in the beam group 1, where the PDCCH3 contains the 2-bit DAI set to "10", and the indication number thereof is "3" according to Table 2, which indicates that this is the third scheduled downlink transmission; at the same time, the beam4 in the beam group 2 is used to transmit one PDCCH4 which schedules one PDSCH4 using one beam in the beam group 2, where the PDCCH4 contains the 2-bit DAI set to "11", and the indication number thereof is "4" according to Table 2, which indicates that this is the fourth scheduled downlink transmission or 4 downlink transmissions have been scheduled cumulatively up to the current position. The above scheduling process is shown in FIG. 2 and FIG. 3.

User Equipment Side

The user equipment detects the PDCCH in the downlink time 1. When the user equipment detects the PDCCH1 using the beam1 and the PDCCH2 using the beam4, it further receives the corresponding PDSCH1 and PDSCH2 according to the scheduling information in the PDCCHs, and generates the ACK/NACK feedback information for the PDSCH1 and PDSCH2.

No PDCCH is detected in the downlink time 2.

The PDCCH is detected in the downlink time 3. When the user equipment detects the PDCCH3 using the beam1 and the PDCCH4 using the beam4, it further receives the corresponding PDSCH3 and PDSCH4 according to the scheduling information in the PDCCHs, and generates the ACK/NACK feedback information for the PDSCH3 and PDSCH4.

The ACK/NACKs are sorted according to the DAIs in the PDCCH1 to PDCCH4. The processes refer to FIG. 4 and FIG. 5.

When one PDSCH corresponds to one ACK/NACK feedback information, the 1-bit ACK/NACK corresponding to the PDSCH1 is mapped to the first position (i.e., position with the position index being 0 when starting from 0) of the ACK/NACK sequence; the 1-bit ACK/NACK corresponding to the PDSCH2 is mapped to the second position (i.e., position with the position index being 1 when starting from 0) of the ACK/NACK sequence; the 1-bit ACK/NACK corresponding to the PDSCH3 is mapped to the third position (i.e., position with the position index being 2 when starting from 0) of the ACK/NACK sequence; the 1-bit ACK/NACK corresponding to the PDSCH4 is mapped to the fourth position (i.e., position with the position index being 3 when starting from 0) of the ACK/NACK sequence.

Figure 4:
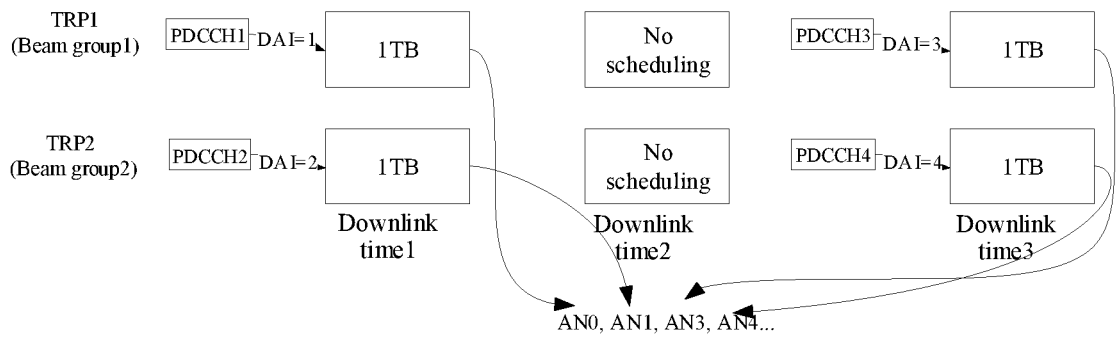
FIG. 4 is a schematic diagram of DAI in the transmission process according to an embodiment of the invention.

As shown in FIG. 4, the ANi sequence is the ACK/NACK sequence to be fed back. The bit number of the ACK/NACK sequence to be fed back may be dynamically notified by the indication field in the DCI, for example, it is 4 bits according to the actual scheduling situation; or it may be semi-statically fixed, for example, determined as the fixed 6 bits according to the corresponding number of 3 downlink time. If the feedback information actually obtained according to the received downlink transmissions is less than 6 bits, the NACK(s) is/are supplemented at the sequence end. For example, it is assumed that the PDSCH1 corresponds to ACK, the PDSCH2 corresponds to NACK, the PDSCH3 corresponds to ACK, and the PDSCH4 corresponds to NACK, then the ACK/NACK sequence to be fed back is {ACK, NACK, ACK, NACK} in the case of 4 bits, and the ACK/NACK sequence to be fed back is {ACK, NACK, ACK, NACK, NACK, NACK} in the case of 6 bits.

When one PDSCH corresponds to two ACK/NACK feedback information, the 2-bit ACK/NACK corresponding to the PDSCH1 is mapped to the first and second positions (i.e., positions with the position indexes being 0 and 1 when starting from 0) of the ACK/NACK sequence; the 2-bit ACK/NACK corresponding to the PDSCH2 is mapped to the third and fourth positions (i.e., positions with the position indexes being 2 and 3 when starting from 0) of the ACK/NACK sequence; the 2-bit ACK/NACK corresponding to the PDSCH3 is mapped to the fifth and sixth positions (i.e., positions with the position indexes being 4 and 5 when starting from 0) of the ACK/NACK sequence; the 2-bit ACK/NACK corresponding to the PDSCH4 is mapped to the seventh and eighth positions (i.e., positions with the position indexes being 6 and 7 when starting from 0) of the ACK/NACK sequence.

Figure 5:
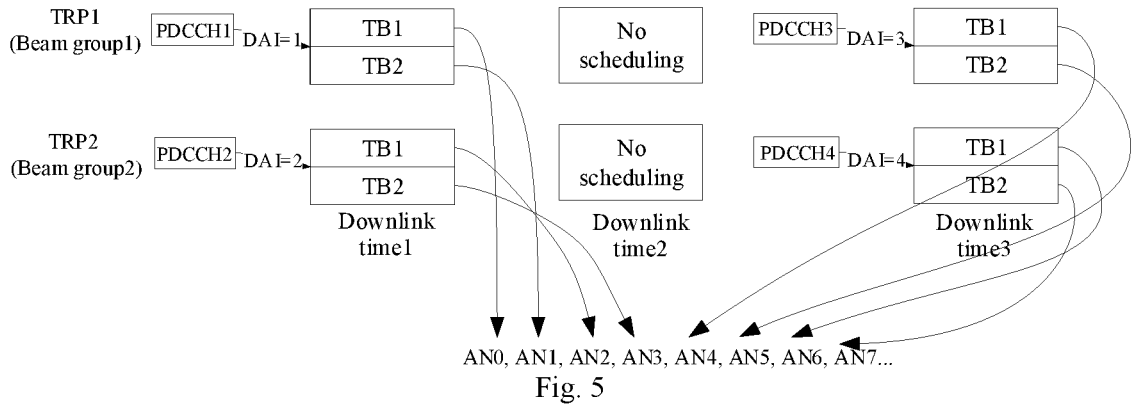
FIG. 5 is a schematic diagram of DAI in the transmission process according to an embodiment of the invention.

As shown in FIG. 5, the ANi sequence is the ACK/NACK sequence to be fed back; the bit number of the ACK/NACK sequence to be fed back may be dynamically notified by the indication field in the DCI, for example, it is 8 bits according to the actual scheduling situation; or it may be semi-statically fixed, for example, determined as the fixed 12 bits according to the corresponding number of 3 downlink time. If the feedback information actually obtained according to the received downlink transmissions is less than 12 bits, the NACK(s) is/are supplemented at the sequence end. For example, it is assumed that the PDSCH1 corresponds to ACK, ACK, the PDSCH2 corresponds to NACK, NACK, the PDSCH3 corresponds to ACK, ACK, and the PDSCH4 corresponds to NACK, NACK, then the ACK/NACK sequence to be fed back is {ACK, ACK, NACK, NACK, ACK, ACK, NACK, NACK} when the ACK/NACK sequence to be fed back is 8 bits, and the ACK/NACK sequence to be fed back is {ACK, ACK, NACK, NACK, ACK, ACK, NACK, NACK, NACK, NACK, NACK, NACK} when the ACK/NACK sequence to be fed back is 12 bits.

The user equipment transmits the above bit information on the PUCCH and/or PUSCH in the feedback time for feeding back the ACK/NACK commonly corresponding to the downlink time 1-3.

The base station receives the above bit information on the PUCCH and/or PUSCH in the feedback time for feeding back the ACK/NACK commonly corresponding to the downlink time 1-3, and parses according to the same sorting process at the user equipment side described above. Taking the 8-bit case as an example, the first and second feedback information bits ACK and ACK correspond to the PDSCH1. For example, they correspond to two TBs of PDSCH1, or if the PDSCH1 is one TB but divided into two CBGs, they corresponds to each CBG respectively, so the PDSCH1 does not need to be retransmitted. The method of determining the ACK/ACKs corresponding to the PDSCHs described below is the same and will not be described again. The third and fourth feedback information bits NACK and NACK correspond to the PDSCH2, so the PDSCH2 needs to be retransmitted; the fifth and sixth feedback information bits NACK and NACK correspond to the PDSCH3, so the PDSCH3 needs to be retransmitted; the seventh and eighth feedback information bits ACK and NACK correspond to the PDSCH4, so the second TB or the second CBG of PDSCH4 needs to be retransmitted.

When the user equipment is configured with or activates multiple serving cells/carriers/bandwidth parts, as an embodiment, the corresponding ACK/NACK sequence may be generated according to the processes in the above third and fourth embodiments on each serving cell/carrier/bandwidth part, and then the ACK/NACK sequences corresponding to all the serving cells/carriers/bandwidth parts are cascaded in order of the indexes of the serving cells/carriers/bandwidth parts and transmitted on the PUCCH and/or PUSCH in the corresponding feedback time for feeding back the ACK/NACKs. The base station side parses the received ACK/NACK sequences in the same cascading order described above, so as to obtain the ACK/NACK feedback information corresponding to the PUSCH of each serving cell/carrier/bandwidth part.

Fifth Embodiment

It is assumed that the user equipment is configured with or activates multiple serving cells/carriers/bandwidth parts. Taking three serving cells as an example, it is assumed that there are 2 TRPs in the serving cell, the TRP is embodied by the beam group, and the beam is embodied by the CSI-RS resource (or resource+port); for each serving cell, through 6 CSI-RS resources and grouping of the third embodiment, all the CSI-RS resources, beam groups and beam indexes on different cells may use the same index set. For example, there is the beam group 1 in the serving cell 1, which contains beam1, beam2, beam3 and accordingly corresponds to the TRP1 in the serving cell 1, and there is the beam group 2 in the serving cell 1, which contains beam3, beam4, beam5 and accordingly corresponds to the TRP2 in the serving cell 1; there is the beam group 1 in the serving cell 2, which contains beam1, beam2, beam3 and accordingly corresponds to the TRP1 in the serving cell 2, and there is the beam group 2 in the serving cell 2, which contains beam3, beam4, beam5 and accordingly corresponds to the TRP2 in the serving cell 2; there is the beam group 1 in the serving cell 3, which contains beam1, beam2, beam3 and accordingly corresponds to the TRP1 in the serving cell 3, and there is the beam group 2 in the serving cell 3, which contains beam3, beam4, beam5 and accordingly corresponds to the TRP2 in the serving cell 3.

The beams, beam groups, and TRPs with the same indexes in different serving cells may indicate different beams, beam groups, and TRPs because these parameters are unique to the serving cell.

Of course, the beams, beam groups and TRPs in different serving cells may also be uniformly indexed in sequence. For example, there is the beam group 1 in the serving cell 1, which contains beam1, beam2, beam3 and accordingly corresponds to the TRP1 in the serving cell 1; there is the beam group 2 in the serving cell 1, which contains beam4, beam5, beam6 and accordingly corresponds to the TRP2 in the serving cell 1; there is the beam group 3 in the serving cell 2, which contains beam7, beam8, beam9 and accordingly corresponds to the TRP3 in the serving cell 2; there is the beam group 4 in the serving cell 2, which contains beam10, beam11, beam12 and accordingly corresponds to the TRP4 in the serving cell 1; there is the beam group 5 in the serving cell 3, which contains beam13, beam14, beam15 and accordingly corresponds to the TRPS on the serving cell 3; there is the beam group 6 in the serving cell 3, which contains beam16, beam17, beam18 and accordingly corresponds to the TRP6 in the serving cell 3.

When one uplink time only corresponds to the ACK/NACK feedback information of one downlink time.

The specific transmission process includes the followings.

Base Station Side

The base station transmits one PDCCH1 in the downlink time 1 and in the serving cell 1 by using the beam in the beam group 1 in the serving cell 1 (or the uniformly indexed beam group 1), where the PDCCH1 schedules one PDSCH1, the PDCCH1 contains the 2-bit DAI set to "00", and the indication number thereof is "1" according to Table 2, which indicates that this is the first scheduled downlink transmission; at the same time, the beam in the beam group 2 in the serving cell 1 (or the uniformly indexed beam group 2) is used to transmit one PDCCH2 which schedules one PDSCH2, where the PDCCH2 contains the 2-bit DAI set to "01", and the indication number thereof is "2" according to Table 2, which indicates that this is the second scheduled downlink transmission or 2 downlink transmissions have been scheduled cumulatively up to the current position.

In the downlink time 1 and in the serving cell 2, the beam in the beam group 1 in the serving cell 2 (or the uniformly indexed beam group 3) is used to transmit one PDCCH3 which schedules one PDSCH3, where the PDCCH3 contains the 2-bit DAI set to "10", and the indication number thereof is "3" according to Table 2, which indicates that this is the third scheduled downlink transmission or 3 downlink transmissions have been scheduled cumulatively up to the current position; at the same time, the beam in the beam group 2 in the serving cell 2 (or the uniformly indexed beam group 4) is used to transmit one PDCCH4 which schedules one PDSCH4, where the PDCCH4 contains the 2-bit DAI set to "11", and the indication number thereof is "4" according to Table 2, which indicates that this is the fourth scheduled downlink transmission or 4 downlink transmissions have been scheduled cumulatively up to the current position.

In the downlink time 1 and in the serving cell 3, the beam in the beam group 2 in the serving cell 3 (or the uniformly indexed beam group 6) is used to transmit one PDCCHS which schedules one PDSCHS, where the PDCCHS contains the 2-bit DAI set to "00", and the indication number thereof is "5" according to Table 2, which indicates that this is the fifth scheduled downlink transmission or 5 downlink transmissions have been scheduled cumulatively up to the current position; and the base station does not use the beams in the beam group 1 in the serving cell 3 (or the uniformly indexed beam group 5) to schedule accordingly. Here, when the indication number of the DAI is "1" and the indication number is "5", they correspond to the same DAI state.

User Equipment Side

The user equipment detects the PDCCHs according to different beam groups in the serving cells 1, 2, 3 in the downlink time 1, and sorts the ACK/NACKs according to the DAIs in the detected PDCCHs.

When one PDSCH corresponds to one ACK/NACK feedback information, the 1-bit ACK/NACK corresponding to the PDSCH1 is mapped to the first position (i.e., position with the position index being 0 when starting from 0) of the ACK/NACK sequence; the 1-bit ACK/NACK corresponding to the PDSCH2 is mapped to the second position (i.e., position with the position index being 1 when starting from 0) of the ACK/NACK sequence, and so on; the 1-bit ACK/NACK corresponding to the PDSCH5 is mapped to the fifth position (i.e., position with the position index being 4 when starting from 0) of the ACK/NACK sequence.

Figure 6:
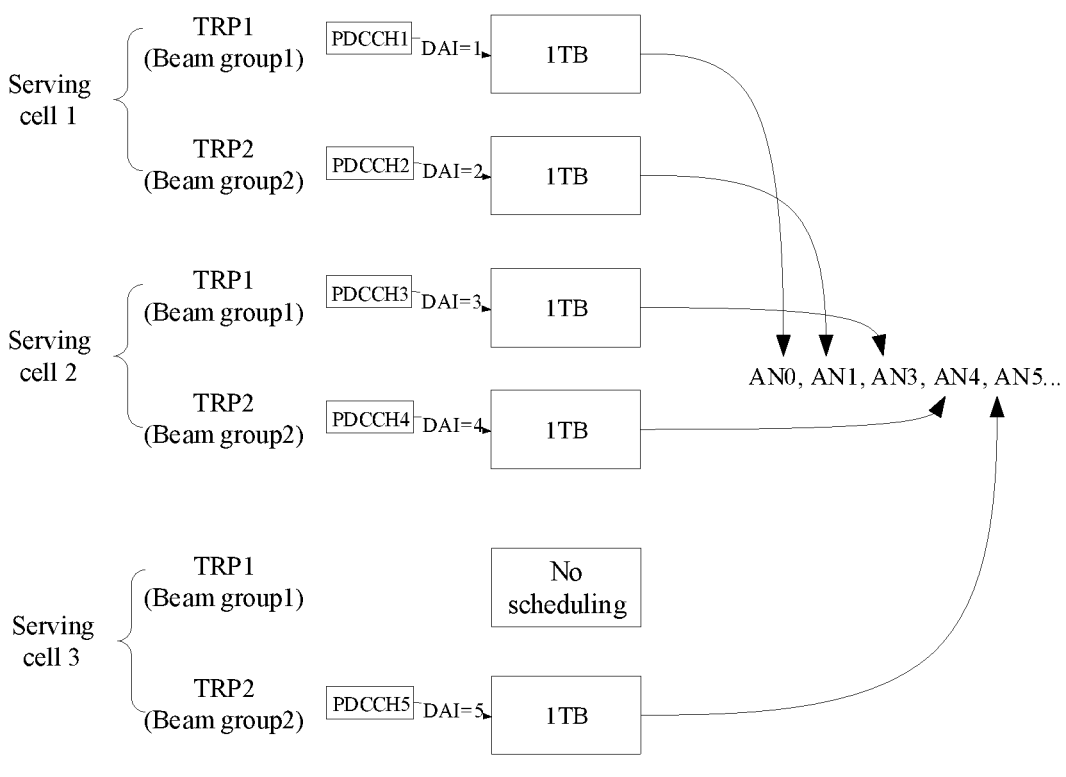
FIG. 6 is a schematic diagram of DAI in the transmission process according to an embodiment of the invention.

As shown in FIG. 6, the ANi sequence is the ACK/NACK sequence to be fed back; the bit number of the ACK/NACK sequence to be fed back may be dynamically notified by the indication field in the DCI, for example, it is 5 bits according to the actual scheduling; or it may be semi-statically fixed, for example, determined as 6 bits according to the product of the number of serving cells, the number of TRPs in each cell, and the number of the ACK/NACK feedback information corresponding to each TRP. When the number of the ACK/NACK bits of the downlink transmission received actually is less than 6 bits, the NACK(s) is/are supplemented at the end. For example, it is assumed that the PDSCH1 corresponds to ACK, the PDSCH2 corresponds to NACK, the PDSCH3 corresponds to ACK, the PDSCH4 corresponds to NACK, and the PDSCH5 corresponds to ACK, then the ACK/NACK sequence to be fed back is {ACK, NACK, ACK, NACK, ACK} when the ACK/NACK sequence to be fed back is 5 bits, and the ACK/NACK sequence to be fed back is {ACK, NACK, ACK, NACK, ACK, NACK} when the ACK/NACK sequence to be fed back is 6 bits.

When one PDSCH corresponds to two ACK/NACK feedback information, the 2-bit ACK/NACK corresponding to the PDSCH1 is mapped to the first and second positions (i.e., positions with the position indexes being 0 and 1 when starting from 0) of the ACK/NACK sequence; the 2-bit ACK/NACK corresponding to the PDSCH2 is mapped to the third and fourth positions (i.e., positions with the position indexes being 2 and 3 when starting from 0) of the ACK/NACK sequence, and so on; the 2-bit ACK/NACK corresponding to the PDSCH5 is mapped to the ninth and tenth positions (i.e., positions with the position indexes being 8 and 9 when starting from 0) of the ACK/NACK sequence.

Figure 7:
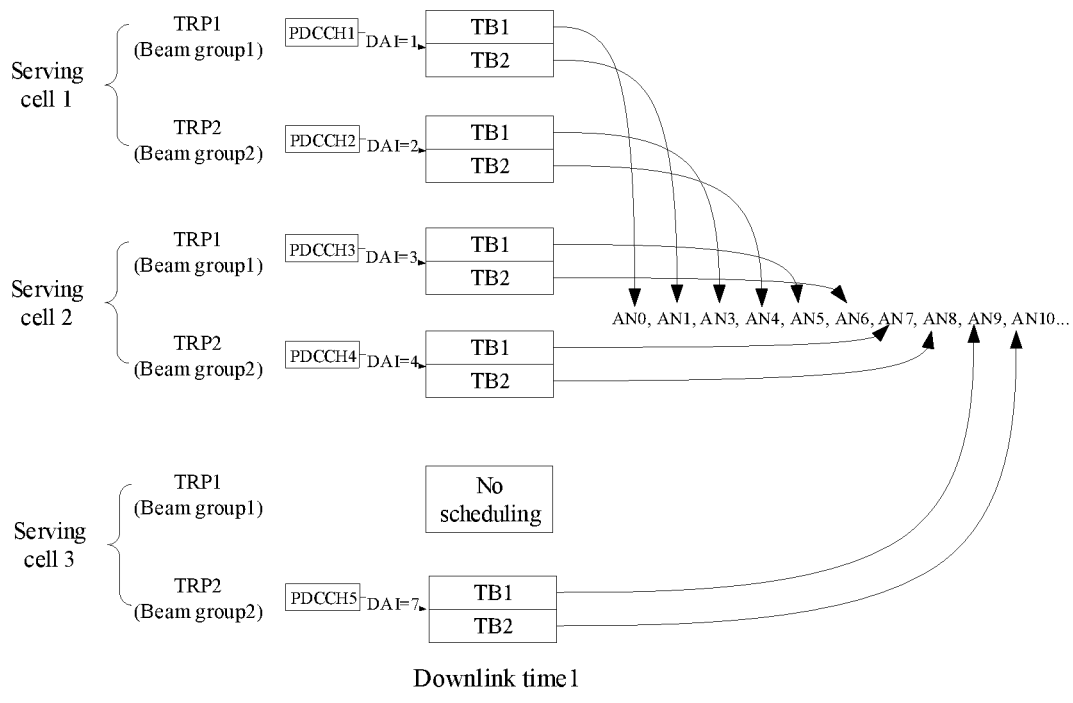
FIG. 7 is a schematic diagram of DAI in the transmission process according to an embodiment of the invention.

As shown in FIG. 7, the ANi sequence is the ACK/NACK sequence to be fed back. The bit number of the ACK/NACK sequence to be fed back may be dynamically notified by the indication field in the DCI, for example, it is 10 bits according to the actual scheduling; or it may be semi-statically fixed, for example, determined as 12 bits according to the product of the number of serving cells, the number of TRPs in each cell, and the number of the ACK/NACK feedback information corresponding to each TRP. When the number of the ACK/NACK bits of the downlink transmission received actually is less than 12 bits, the NACK(s) is/are supplemented at the end. For example, it is assumed that the PDSCH1 corresponds to ACK, ACK, the PDSCH2 corresponds to NACK, NACK, the PDSCH3 corresponds to ACK, ACK, the PDSCH4 corresponds to NACK, NACK, and the PDSCH5 corresponds to ACK, ACK, then the ACK/NACK sequence to be fed back is {ACK, ACK, NACK, NACK, ACK, ACK, NACK, NACK, ACK, ACK} when the ACK/NACK sequence to be fed back is 10 bits, and the ACK/NACK sequence to be fed back is {ACK, ACK, NACK, NACK, ACK, ACK, NACK, NACK, ACK, ACK, NACK, NACK} when the ACK/NACK sequence to be fed back is 12 bits.

The user equipment transmits the above bit information on the PUCCH and/or PUSCH in the feedback time for feeding back the ACK/NACK corresponding to the downlink time 1.

The base station receives the above bit information on the PUCCH and/or PUSCH in the feedback time for feeding back the ACK/NACK corresponding to the downlink time 1, and parses in accordance with the same sorting process at the user equipment side described above, to thereby judge whether the retransmission is required.

Sixth Embodiment

On the basis of the fifth embodiment described above, when one uplink time corresponds to the ACK/NACK feedback information of multiple downlink time, one uplink time corresponding to the ACK/NACK feedback information of two downlink times is taken as an example for illustration.

Base Station Side

The transmission process of the base station in the serving cells 1 to 3 in the downlink time 1 are the same as those in the fifth embodiment.

The base station transmits one PDCCH6 in the downlink time 2 and in the serving cell 1 by using the beam in the beam group 1 in the serving cell 1 (or the uniformly indexed beam group 1), where the PDCCH6 schedules one PDSCH6, the PDCCH6 contains the 2-bit DAI set to "01", and the indication number thereof is "6" according to Table 2, which indicates that this is the sixth scheduled downlink transmission or 6 downlink transmissions have been scheduled cumulatively up to the current position; at the same time, the beam in the beam group 2 in the serving cell 1 (or the uniformly indexed beam group 2) is used to transmit one PDCCH7 which schedules one PDSCH7, where the PDCCH7 contains the 2-bit DAI set to "10", and the indication number thereof is "7" according to Table 2, which indicates that this is the seventh scheduled downlink transmission or 7 downlink transmissions have been scheduled cumulatively up to the current position; there is no scheduling in the serving cells 2 and 3 in the downlink time 2.

User Equipment Side

The user equipment detects the PDCCHs in different serving cells in the downlink time 1 and 2 according to the beam groups corresponding to the different serving cells; and sorts the ACK/NACKs according to the DAIs in the detected PDCCHs.

When one PDSCH corresponds to one ACK/NACK feedback information, the 1-bit ACK/NACK corresponding to the PDSCH1 in the downlink time 1 is mapped to the first position (i.e., position with the position index being 0 when starting from 0) of the ACK/NACK sequence, the 1-bit ACK/NACK corresponding to the PDSCH2 in the downlink time 1 is mapped to the second position (i.e., position with the position index being 1 when starting from 0) of the ACK/NACK sequence, and so on; the 1-bit ACK/NACK corresponding to the PDSCH6 in the downlink time 2 is mapped to the sixth position (i.e., position with the position index being 5 when starting from 0) of the ACK/NACK sequence, and the 1-bit ACK/NACK corresponding to the PDSCH7 in the downlink time 2 is mapped to the seventh position (i.e., position with the position index being 6 when starting from 0) of the ACK/NACK sequence.

Figure 8:
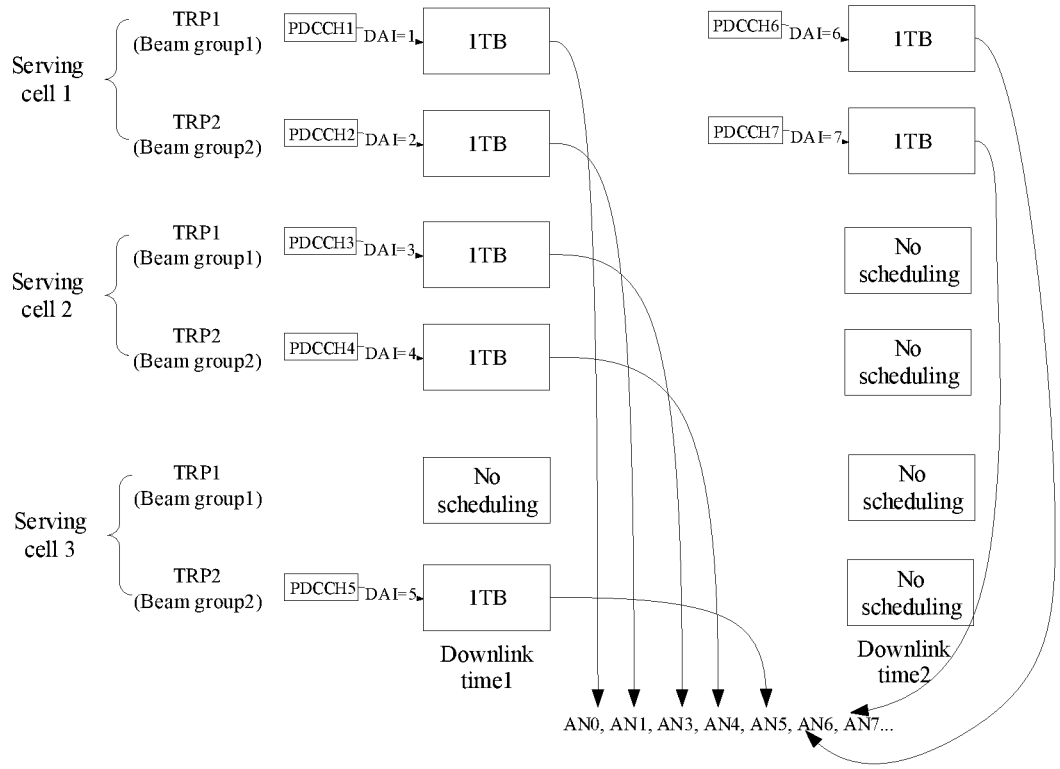
FIG. 8 is a schematic diagram of DAI in the transmission process according to an embodiment of the invention.

As shown in FIG. 8, the ANi sequence is the ACK/NACK sequence to be fed back. The bit number of the ACK/NACK sequence to be fed back may be dynamically notified by the indication field in the DCI, for example, it is 7 bits according to the actual scheduling; or it may be semi-statically fixed, for example, determined as 12 bits according to the product of the number of serving cells, the number of downlink time, the number of TRPs contained in each cell, and the number of the ACK/NACK feedback information corresponding to each TRP. At this time, when the number of the ACK/NACK bits of the downlink transmission received actually is less than 12 bits, the NACK(s) is/are supplemented at the end. For example, it is assumed that the PDSCH1 corresponds to ACK, the PDSCH2 corresponds to NACK, the PDSCH3 corresponds to ACK, the PDSCH4 corresponds to NACK, the PDSCH5 corresponds to ACK, the PDSCH6 corresponds to ACK, and the PDSCH7 corresponds to NACK, then the ACK/NACK sequence to be fed back is {ACK, NACK, ACK, NACK, ACK, ACK, NACK} when the ACK/NACK sequence to be fed back is 7 bits, and the ACK/NACK sequence to be fed back is {ACK, NACK, ACK, NACK, ACK, ACK, NACK, NACK, NACK, NACK, NACK} when the ACK/NACK sequence to be fed back is 12 bits.

When one PDSCH corresponds to two ACK/NACK feedback information, the 2-bit ACK/NACK corresponding to the PDSCH1 in the downlink time 1 is mapped to the first and second positions (i.e., positions with the position indexes being 0 and 1 when starting from 0) of the ACK/NACK sequence, the 2-bit ACK/NACK corresponding to the PDSCH2 in the downlink time 1 is mapped to the third and fourth positions (i.e., positions with the position indexes being 2 and 3 when starting from 0) of the ACK/NACK sequence, and so on; the 2-bit ACK/NACK corresponding to the PDSCH6 in the downlink time 2 is mapped to the eleventh and twelfth positions (i.e., positions with the position indexes being 10 and 11 when starting from 0) of the ACK/NACK sequence, and the 2-bit ACK/NACK corresponding to the PDSCH7 in the downlink time 2 is mapped to the thirteenth and fourteenth positions (i.e., positions with the position indexes being 12 and 13 when starting from 0) of the ACK/NACK sequence.

Figure 9:
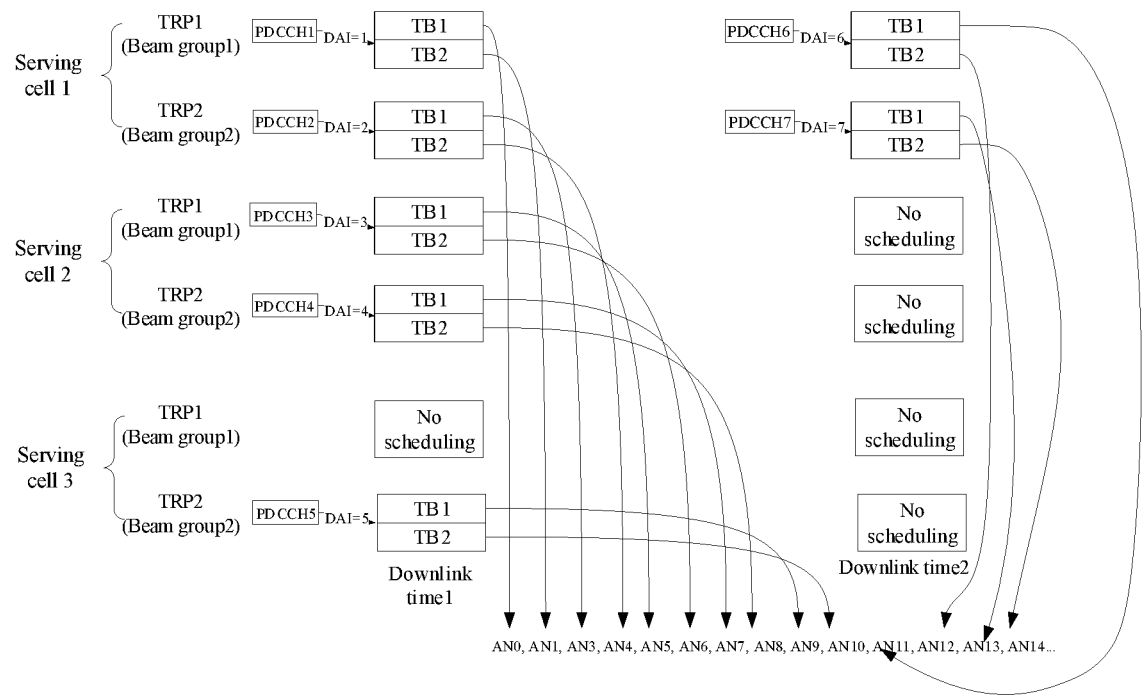
FIG. 9 is a schematic diagram of DAI in the transmission process according to an embodiment of the invention.

As shown in FIG. 9, the ANi sequence is the ACK/NACK sequence to be fed back; the bit number of the ACK/NACK sequence to be fed back may be dynamically notified by the indication field in the DCI, for example, it is 14 bits according to the actual scheduling; or it may be semi-statically fixed, for example, determined as 24 bits according to the product of the number of serving cells, the number of TRPs in each cell, and the number of the ACK/NACK feedback information corresponding to each TRP. Furthermore, when the number of the ACK/NACK bits of the downlink transmission received actually is less than 24 bits, the NACK(s) is/are supplemented at the end. For example, it is assumed that the PDSCH1 corresponds to ACK, ACK, the PDSCH2 corresponds to NACK, NACK, the PDSCH3 corresponds to ACK, ACK, the PDSCH4 corresponds to NACK, NACK, the PDSCH5 corresponds to ACK, ACK, the PDSCH6 corresponds to ACK, ACK, and the PDSCH7 corresponds to NACK, NACK, then the ACK/NACK sequence to be fed back is {ACK, ACK, NACK, NACK, ACK, ACK, NACK, NACK, ACK, ACK, ACK, ACK, NACK, NACK} when the ACK/NACK sequence to be fed back is 14 bits, and the ACK/NACK sequence to be fed back is {ACK, ACK, NACK, NACK, ACK, ACK, NACK, NACK, ACK, ACK, ACK, ACK, NACK, NACK, NACK, NACK, NACK, NACK, NACK, NACK, NACK, NACK, NACK, NACK} when the ACK/NACK sequence to be fed back is 24 bits.

The user equipment transmits the above bit information on the PUCCH and/or PUSCH in the feedback time for feeding back the ACK/NACK commonly corresponding to the downlink time 1 and 2.

The base station receives the above bit information on the PUCCH and/or PUSCH in the feedback time for feeding back the ACK/NACK commonly corresponding to the downlink time 1 and 2, and parses in accordance with the same sorting process at the user equipment side described above.

The value of the DAI in the above FIG. 3 to FIG. 9 is the value of the indication number corresponding to the DAI but not the binary state of the DAI. Of course, it is also applicable if the value is replaced by the binary state of the DAI.

Seventh Embodiment

Figure 10:
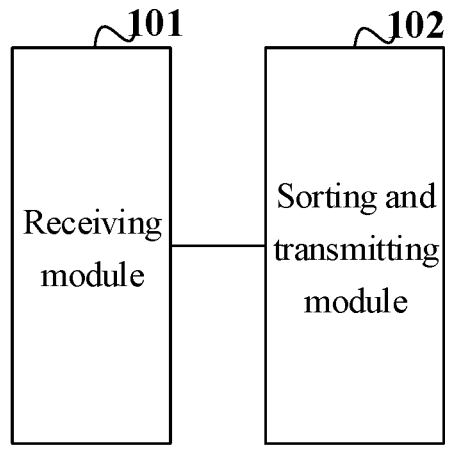
FIG. 10 is a structural schematic diagram of a transmission device according to an embodiment of the invention.

FIG. 10 is a schematic structural diagram of a transmission device according to an embodiment of the invention. The transmission device is applied to a user equipment and includes: a receiving module 101 configured to receive the downlink transmissions; a sorting and transmitting module 102 configured to sort the ACK/NACK feedback information of the downlink transmissions according to the DAIs corresponding to the downlink transmissions to obtain and transmit the ACK/NACK sequence to be fed back, wherein the DAIs cumulatively count the downlink transmissions at least in order of TRPs.

The sorting and transmitting module 102 is configured to: when there are downlink transmissions in at least two different downlink times in the same configured or activated serving cell/carrier/bandwidth part, that need to perform the ACK/NACK feedbacks in the same uplink time, the DAIs cumulatively count the downlink transmissions in order of TRP first and time domain later.

The sorting and transmitting module 102 is configured to: when there is a downlink shared channel without corresponding downlink control channel in at least one of the at least two downlink times, map the ACK/NACK of the downlink shared channel without corresponding downlink control channel to a predetermined position in the ACK/NACK sequence corresponding to the serving cell/carrier/bandwidth part.

Here, the predetermined position is the first X-bit positions or last X-bit positions in the ACK/NACK sequence, wherein X is the bit number of the ACK/NACK of the downlink shared channel without corresponding downlink control channel.

The sorting and transmitting module 102 is configured to: when the number of configured or activated serving cells/carriers/bandwidth parts is at least two, the DAIs cumulatively count the downlink transmissions in order of TRP first and frequency domain later; or when the number of configured or activated serving cells/carriers/bandwidth parts is at least two, the DAIs count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs cumulatively count the downlink transmissions in order of TRP first, frequency domain later and time domain last.

The sorting and transmitting module 102 is configured to: assume that the DAI value corresponding to one downlink transmission is DAI(k), then map the ACK/NACK of the one downlink transmission to the index positions C*DAI(k)-C to C*DAI(k)-1 in the ACK/NACK sequence, wherein it is assumed that the index positions start from 0, and C is the bit number of the ACK/NACK feedback of one downlink transmission; or assume that the DAI value corresponding to one downlink transmission is DAI(k), then map the ACK/NACK of the one downlink transmission to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Here, the TRP is represented as a beam group.

The receiving module 101 is configured to: obtain the beam group information; and receive the downlink transmissions according to the beam group information.

Here, a beam in the beam group is represented by any one or more combinations of: QCL relationship, resource(s) and/or port(s) of reference signal(s) related to beam measurement, beam index and BPL.

The DAI contains A-bit information, wherein the same state of the A-bit information indicates one indication number or indicates a plurality of different indication numbers.

The downlink transmission includes: a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

Eighth Embodiment

Figure 11:
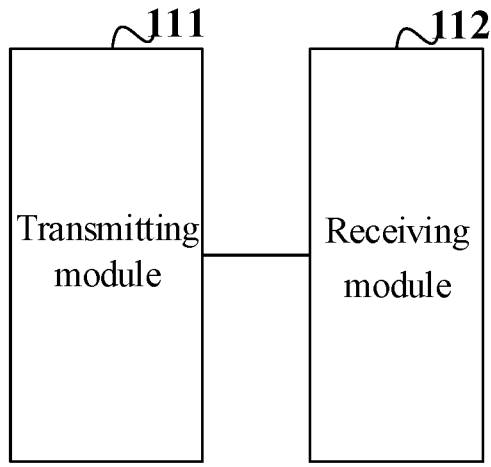
FIG. 11 is a structural schematic diagram of a transmission device according to an embodiment of the invention.

FIG. 11 is a schematic structural diagram of a transmission device according to an embodiment of the invention. The transmission device is applied to a base station and includes: a transmitting module 111 configured to transmit the downlink transmissions, wherein the DAIS corresponding to the downlink transmissions cumulatively count the downlink transmissions at least in order of TRPs; a receiving module 112 configured to receive the ACK/NACK sequence, wherein the ACK/NACK feedback information of the downlink transmissions is sorted in the ACK/NACK sequence according to the DAIS.

The transmitting module 111 is configured to: when there are downlink transmissions in at least two different downlink times in the same configured or activated serving cell/carrier/bandwidth part, that need to perform the ACK/NACK feedbacks in the same uplink time, the DAIs corresponding to the downlink transmissions cumulatively count the downlink transmissions in order of TRP first and time domain later.

The receiving module 112 is configured to: when there is a downlink shared channel without corresponding downlink control channel in at least one of the at least two downlink times, determine that the ACK/NACK of the downlink shared channel without corresponding downlink control channel is mapped to a predetermined position in the ACK/NACK sequence corresponding to the serving cell/carrier/bandwidth part.

Here, the predetermined position is the first X-bit positions or last X-bit positions in the ACK/NACK sequence, wherein X is the bit number of the ACK/NACK of the downlink shared channel without corresponding downlink control channel.

The transmitting module 111 is configured to: when the number of configured or activated serving cells/carriers/bandwidth parts is at least two, the DAIs corresponding to the downlink transmissions cumulatively count the downlink transmissions in order of TRP first and frequency domain later; or when the number of configured or activated serving cells/carriers/bandwidth parts is at least two, the DAIs corresponding to the downlink transmissions count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs corresponding to the downlink transmissions cumulatively count the downlink transmissions in order of TRP first, frequency domain later and time domain last.

The receiving module 112 is configured to: assume that the DAI value corresponding to one downlink transmission is DAI(k), then determine that the ACK/NACK of the one downlink transmission is mapped to the index positions C*DAI(k)-C to C*DAI(k)-1 in the ACK/NACK sequence, wherein it is assumed that the index positions start from 0, and C is the bit number of the ACK/NACK feedback of one downlink transmission; or assume that the DAI value corresponding to one downlink transmission is DAI(k), then determine that the ACK/NACK of the one downlink transmission is mapped to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Here, the TRP is represented as a beam group.

The transmitting module 111 is specifically configured to: determine a beam group and transmit the configuration information indicating the beam group to a user equipment; and transmit the downlink transmissions according to the beam group information.

Here, a beam in the beam group is represented by any one or more combinations of: QCL relationship, resource(s) and/or port(s) of reference signal(s) related to beam measurement, beam index and BPL.

The DAI contains A-bit information, wherein the same state of the A-bit information indicates one indication number or indicates a plurality of different indication numbers.

The downlink transmission includes: a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

Ninth Embodiment

Based on the same inventive concept, an embodiment of the invention further provides a user equipment. Since the principle solving the problem of the above user equipment is similar to the transmission method, the implementations of the above user equipment may refer to the implementations of the method, and the repeated description thereof will be omitted here.

Figure 12:
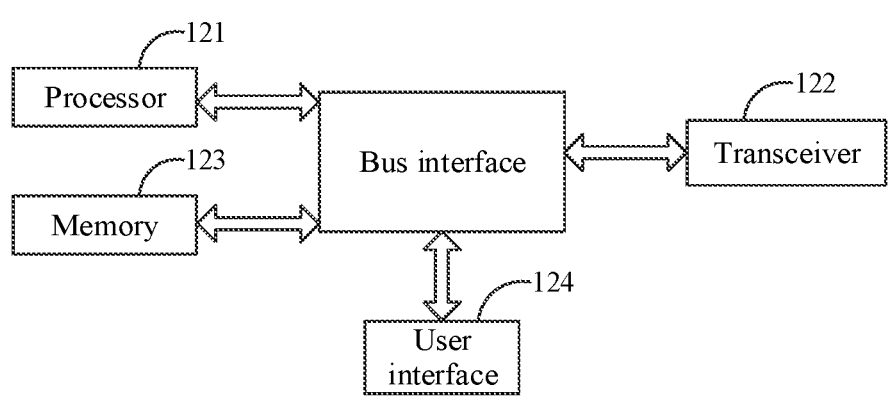
FIG. 12 is a structural schematic diagram of a user equipment according to an embodiment of the invention.

As shown in FIG. 12, it is a schematic structural diagram of the user equipment according to the embodiment of the invention, wherein the bus architecture in FIG. 12 may include any numbers of interconnected buses and bridges, and specifically link various circuits of one or more processors represented by the processor 121 and the memory represented by the memory 123. The bus architecture may further link various other circuits such as peripheral device, voltage regulator and power management circuit, which are all well known in the art and thus will not be further described again herein. The bus interface provides an interface. The transceiver 122 may be a plurality of elements, i.e., include a transmitter and a receiver, and provide the units for communicating with various other devices over the transmission media. For different user equipments, the user interface 124 may also be the interface capable of interconnecting or exter-connecting with the required devices, and the connected devices include but not limited to keypad, display, loudspeaker, microphone, joystick and the like. The processor 121 is responsible for managing the bus architecture and general processing, and the memory 123 may store the data used by the processor 121 when performing the operations.

In the user equipment provided by the embodiment of the invention: the processor 121 is configured to read the programs in the memory 123 and perform the process of: receiving the downlink transmissions via the transceiver 122; and sorting the ACK/NACK feedback information of the downlink transmissions according to the DAIs corresponding to the downlink transmissions to obtain and transmit the ACK/NACK sequence to be fed back, wherein the DAIs cumulatively count the downlink transmissions at least in order of TRPs.

Preferably, the processor 121 is configured to: when there are downlink transmissions in at least two different downlink times in the same configured or activated serving cell/carrier/bandwidth part, that need to perform the ACK/NACK feedbacks in the same uplink time, the DAIs cumulatively count the downlink transmissions in order of TRP first and time domain later.

Preferably, the processor 121 is configured to: when there is a downlink shared channel without corresponding downlink control channel in at least one of the at least two downlink times, map the ACK/NACK of the downlink shared channel without corresponding downlink control channel to a predetermined position in the ACK/NACK sequence corresponding to the serving cell/carrier/bandwidth part.

Preferably, the predetermined position is the first X-bit positions or last X-bit positions in the ACK/NACK sequence, wherein X is the bit number of the ACK/NACK of the downlink shared channel without corresponding downlink control channel.

Preferably, the processor 121 is configured to: when the number of configured or activated serving cells/carriers/bandwidth parts is at least two, the DAIs cumulatively count the downlink transmissions in order of TRP first and frequency domain later; or when the number of configured or activated serving cells/carriers/bandwidth parts is at least two, the DAIs count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs cumulatively count the downlink transmissions in order of TRP first, frequency domain later and time domain last.

Preferably, the processor 121 is configured to: assume that the DAI value corresponding to one downlink transmission is DAI(k), then map the ACK/NACK of the one downlink transmission to the index positions C*DAI(k)-C to C*DAI(k)-1 in the ACK/NACK sequence, wherein it is assumed that the index positions start from 0, and C is the bit number of the ACK/NACK feedback of one downlink transmission; or assume that the DAI value corresponding to one downlink transmission is DAI(k), then map the ACK/NACK of the one downlink transmission to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Preferably, the TRP is represented as a beam group.

Preferably, the processor is configured to: obtain beam group information; and receive downlink transmissions via the transceiver 122 according to the beam group information.

Preferably, a beam in the beam group is represented by any one or more combinations of: QCL relationship, resource(s) and/or port(s) of reference signal(s) related to beam measurement, beam index and BPL.

Preferably, the DAI contains the A-bit information, wherein the same state of the A-bit information indicates one indication number or indicates a plurality of different indication numbers.

Preferably, the downlink transmission includes: a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

Tenth Embodiment

Based on the same inventive concept, an embodiment of the invention further provides a base station. Since the principle solving the problem of the base station is similar to the transmission method, the implementations of the above base station may refer to the implementations of the method, and the repeated description thereof will be omitted here.

Figure 13:
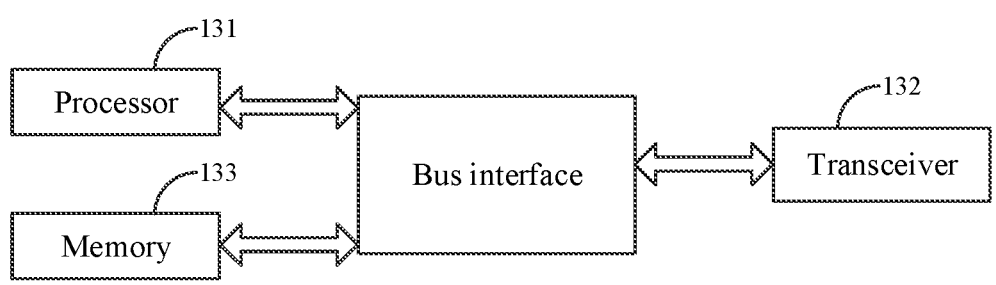
FIG. 13 is a structural schematic diagram of a user equipment according to an embodiment of the invention.

As shown in FIG. 13, it is a schematic structural diagram of the base station provided by the embodiment of the invention, wherein the bus architecture in FIG. 13 may include any numbers of interconnected buses and bridges, and specifically link various circuits of one or more processors represented by the processor 131 and the memory represented by the memory 133. The bus architecture may further link various other circuits such as peripheral device, voltage regulator and power management circuit, which are all well known in the art and thus will not be further described again herein. The bus interface provides an interface. The transceiver 132 may be a plurality of elements, i.e., include a transmitter and a receiver, and provide the units for communicating with various other devices over the transmission media. The processor 131 is responsible for managing the bus architecture and general processing, and the memory 133 may store the data used by the processor 131 when performing the operations.

In the base station provided by the embodiment of the invention: the processor 131 is configured to read the programs in the memory 133 and perform the process of: transmitting the downlink transmissions via the transceiver 132, wherein the DAIs corresponding to the downlink transmissions cumulatively count the downlink transmissions at least in order of TRPs; and receiving the ACK/NACK sequence, wherein the ACK/NACK feedback information of the downlink transmissions is sorted in the ACK/NACK sequence according to the DAIs.

Preferably, the processor 131 is configured to: when there are downlink transmissions in at least two different downlink times in the same configured or activated serving cell/carrier/bandwidth part, that need to perform the ACK/NACK feedbacks in the same uplink time, the DAIs corresponding to the downlink transmissions cumulatively count the downlink transmissions in order of TRP first and time domain later.

Preferably, the processor 131 is configured to: when there is a downlink shared channel without corresponding downlink control channel in at least one of the at least two downlink times, determine that the ACK/NACK of the downlink shared channel without corresponding downlink control channel is mapped to a predetermined position in the ACK/NACK sequence corresponding to the serving cell/carrier/bandwidth part.

Preferably, the predetermined position is the first X-bit positions or last X-bit positions in the ACK/NACK sequence, wherein X is the bit number of the ACK/NACK of the downlink shared channel without corresponding downlink control channel.

Preferably, the processor 131 is configured to: when the number of configured or activated serving cells/carriers/bandwidth parts is at least two, the DAIs corresponding to the downlink transmissions cumulatively count the downlink transmissions in order of TRP first and frequency domain later; or when the number of configured or activated serving cells/carriers/bandwidth parts is at least two, the DAIs corresponding to the downlink transmissions count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs corresponding to the downlink transmissions cumulatively count the downlink transmissions in order of TRP first, frequency domain later and time domain last.

Preferably, the processor 131 is configured to: assume that the DAI value corresponding to one downlink transmission is DAI(k), then determine that the ACK/NACK of the one downlink transmission is mapped to the index positions $C*DAI(k)-C$ to $C*DAI(k)-1$ in the ACK/NACK sequence, wherein it is assumed that the index positions start from 0, and C is the bit number of the ACK/NACK feedback of one downlink transmission; or assume that the DAI value corresponding to one downlink transmission is DAI(k), then determine that the ACK/NACK of the one downlink transmission is mapped to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Preferably, the TRP is represented as a beam group.

Preferably, the processor is configured to: determine a beam group and transmit the configuration information indicating the beam group to a user equipment via the transceiver 132; and transmit the downlink transmissions via the transceiver 132 according to beam group information.

Preferably, a beam in the beam group is represented by any one or more combinations of: QCL relationship, resource(s) and/or port(s) of reference signal(s) related to beam measurement, beam index and BPL.

Preferably, the DAI contains the A-bit information, wherein the same state of the A-bit information indicates one indication number or indicates a plurality of different indication numbers.

Preferably, the downlink transmission includes: a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

Eleventh Embodiment

On the basis of the above embodiments, an embodiment of the invention further provides a computer readable storage medium storing the computer programs executable by an electronic device, where the programs, when executed on the electronic device, cause the electronic device to perform the steps of: receiving the downlink transmissions; and sorting the ACK/NACK feedback information of the downlink transmissions according to the DAIS corresponding to the downlink transmissions to obtain and transmit the ACK/NACK sequence to be fed back, wherein the DAIS cumulatively count the downlink transmissions at least in order of TRPs.

Preferably, the DAIS cumulatively count the downlink transmissions at least in order of TRPs, which includes: when there are downlink transmissions in at least two different downlink times in the same configured or activated serving cell/carrier/bandwidth part, that need to perform the ACK/NACK feedbacks in the same uplink time, the DAIS cumulatively count the downlink transmissions in order of TRP first and time domain later.

Preferably, when there is a downlink shared channel without corresponding downlink control channel in at least one of the at least two downlink times, the ACK/NACK of the downlink shared channel without corresponding downlink control channel is mapped to a predetermined position in the ACK/NACK sequence corresponding to the serving cell/carrier/bandwidth part.

Preferably, the predetermined position is the first X-bit positions or last X-bit positions in the ACK/NACK sequence, wherein X is the bit number of the ACK/NACK of the downlink shared channel without corresponding downlink control channel.

Preferably, the DAIs cumulatively count the downlink transmissions at least in order of TRPs, which includes: when the number of configured or activated serving cells/carriers/bandwidth parts is at least two, the DAIs cumulatively count the downlink transmissions in order of TRP first and frequency domain later; or when the number of configured or activated serving cells/carriers/bandwidth parts is at least two, the DAIs count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs cumulatively count the downlink transmissions in order of TRP first, frequency domain later and time domain last.

Preferably, the sorting the ACK/NACK feedback information of the downlink transmissions according to the DAIs corresponding to the downlink transmissions, includes: assuming that the DAI value corresponding to one downlink transmission is DAI(k), then mapping the ACK/NACK of the one downlink transmission to the index positions C*DAI(k)-C to C*DAI(k)-1 in the ACK/NACK sequence, wherein it is assumed that the index positions start from 0 and C is the bit number of the ACK/NACK feedback of one downlink transmission; or assuming that the DAI value corresponding to one downlink transmission is DAI(k), then mapping the ACK/NACK of the one downlink transmission to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and Como is the bit number of the ACK/NACK feedback of one downlink transmission of which the corresponding DAI value is DAI(k).

Preferably, the TRP is represented as a beam group.

Preferably, the receiving the downlink transmissions includes: obtaining the beam group information; and receiving the downlink transmissions according to the beam group information.

Preferably, a beam in the beam group is represented by any one or more combinations of: QCL relationship, resource(s) and/or port(s) of reference signal(s) related to beam measurement, beam index and BPL.

Preferably, the DAI contains the A-bit information, wherein the same state of the A-bit information indicates one indication number or indicates a plurality of different indication numbers.

Preferably, the downlink transmission includes:
a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

Twelfth Embodiment

On the basis of the above embodiments, an embodiment of the invention further provides a computer readable storage medium storing the computer programs executable by an electronic device, where the programs, when executed on the electronic device, cause the electronic device to perform the steps of: transmitting the downlink transmissions, wherein the DAIs corresponding to the downlink transmissions cumulatively count the downlink transmissions at least in order of TRPs; and receiving the ACK/NACK sequence, wherein the ACK/NACK feedback information of the downlink transmissions is sorted in the ACK/NACK sequence according to the DAIs.

Preferably, the DAIs corresponding to the downlink transmissions cumulatively count the downlink transmissions at least in order of TRPs, which includes: when there are downlink transmissions in at least two different downlink times in the same uplink time in the same configured or activated serving cell/carrier/bandwidth part, that need to perform the ACK/NACK feedbacks, the DAIs corresponding to the downlink transmissions cumulatively count the downlink transmissions in order of TRP first and time domain later.

Preferably, the ACK/NACK feedback information of the downlink transmissions is sorted in the ACK/NACK sequence according to the DAIs, which includes: when there is a downlink shared channel without corresponding downlink control channel in at least one of the at least two downlink times, it is determined that the ACK/NACK of the downlink shared channel without corresponding downlink control channel is mapped to a predetermined position in the ACK/NACK sequence corresponding to the serving cell/carrier/bandwidth part.

Preferably, the predetermined position is the first X-bit positions or last X-bit positions in the ACK/NACK sequence, wherein X is the bit number of the ACK/NACK of the downlink shared channel without corresponding downlink control channel.

Preferably, the DAIs corresponding to the downlink transmissions cumulatively count the downlink transmissions at least in order of TRPs, which includes: when the number of configured or activated serving cells/carriers/bandwidth parts is at least two, the DAIs corresponding to the downlink transmissions cumulatively count the downlink transmissions in order of TRP first and frequency domain later; or when the number of configured or activated serving cells/carriers/bandwidth parts is at least two, the DAIs corresponding to the downlink transmissions count independently in different serving cells/carriers/bandwidth parts, and cumulatively count the downlink transmissions in order of TRPs corresponding to each serving cell/carrier/bandwidth part; or when the number of configured or activated serving cells/carriers/bandwidth parts is at least two and there are downlink transmissions in at least two different downlink times that need to perform the ACK/NACK feedbacks in the same uplink time, the DAIs corresponding to the downlink transmissions cumulatively count the downlink transmissions in order of TRP first, frequency domain later and time domain last.

Preferably, the ACK/NACK feedback information of the downlink transmissions is sorted in the ACK/NACK sequence according to the DAIs, which includes: it is assumed that the DAI value corresponding to one downlink transmission is DAI(k), then it is determined that the ACK/NACK of the one downlink transmission is mapped to the index positions C*DAI(k)-C to C*DAI(k)-1 in the ACK/NACK sequence, wherein it is assumed that the index positions start from 0 and C is the bit number of the ACK/NACK feedback of one downlink transmission; or it is assumed that the DAI value corresponding to one downlink transmission is DAI(k), then it is determined that the ACK/NACK of the one downlink transmission is mapped to the index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of the ACK/NACK feedback of one downlink transmission of which the corresponding DAI value is i, and $C_{DAI(k)}$ is the bit number of the ACK/NACK feedback of one downlink transmission of which the corresponding DAI value is DAI(k).

Preferably, the TRP is represented as a beam group.

Preferably, the sending the downlink transmissions includes: determining a beam group and transmitting the configuration information indicating the beam group to a user equipment; and transmitting the downlink transmissions according to the beam group information.

Preferably, a beam in the beam group is represented by any one or more combinations of: QCL relationship, resource(s) and/or port(s) of reference signal(s) related to beam measurement, beam index and BPL.

Preferably, the DAI contains the A-bit information, wherein the same state of the A-bit information indicates one indication number or indicates a plurality of different indication numbers.

Preferably, the downlink transmission includes: a downlink shared channel with a corresponding downlink control channel, and/or a downlink control channel indicating the downlink SRS resource release; wherein the DAI corresponding to the downlink transmission is: when the downlink transmission is a downlink shared channel with a corresponding downlink control channel, the DAI corresponding to the downlink transmission is the DAI in the downlink control channel; when the downlink transmission is a downlink control channel indicating the downlink SRS resource release, the DAI corresponding to the downlink transmission is the DAI in the downlink control channel indicating the downlink SRS resource release.

As for the system/device embodiments, they are basically similar to the method embodiments, so the description is relatively simple, and the related parts refer to the description of the parts of the method embodiments.

It should be understood by those skilled in the art that the embodiments of the present application may be provided as methods, systems and computer program products. Thus the present application may take the form of hardware embodiments alone, software embodiments alone, or embodiments combining the software and hardware aspects. Also the present application may take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions may also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art may make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A transmission method, applied to a user equipment, wherein the method comprises:
    receiving downlink transmissions;
    sorting ACK/NACK feedback information of the downlink transmissions according to Downlink Assignment Indexes, DAIs, corresponding to the downlink transmissions to obtain and transmit an ACK/NACK sequence to be fed back, wherein the DAIs cumulatively count the downlink transmissions at least in order of Transmission Reception Points, TRPs;
    wherein the DAIs cumulatively count the downlink transmissions at least in order of Transmission Reception Points, TRPs, which comprises at least one of:
    when there are downlink transmissions in at least two different downlink times in a same configured or activated target, that need to perform ACK/NACK feedbacks in a same uplink time, the DAIs cumulatively count the downlink transmissions in order of TRP first and time domain later, wherein the target comprises at least one of the serving cell, carrier, bandwidth part;
    when the number of configured or activated targets is at least two, the DAIs cumulatively count the downlink transmissions in order of TRP first and frequency domain later, or the DAIs count independently in different targets and cumulatively count the downlink transmissions in order of TRPs corresponding to each target; or
    when the number of configured or activated targets is at least two and there are downlink transmissions in at least two different downlink times that need to perform ACK/NACK feedbacks in a same uplink time, the DAIs cumulatively count the downlink transmissions in order of TRP first, frequency domain later and time domain last.

2. The method of claim 1, wherein when there is a downlink shared channel without corresponding downlink control channel in at least one of the at least two downlink times, ACK/NACK of the downlink shared channel without corresponding downlink control channel is mapped to a predetermined position in an ACK/NACK sequence corresponding to the target;
    wherein the predetermined position is a first X-bit positions or last X-bit positions in the ACK/NACK sequence, wherein X is the bit number of the ACK/NACK of the downlink shared channel without corresponding downlink control channel.

3. The method of claim 1, wherein the sorting ACK/NACK feedback information of the downlink transmissions according to DAIs corresponding to the downlink transmissions, comprises:
    assuming that a DAI value corresponding to one downlink transmission is DAI(k), mapping ACK/NACK of the one downlink transmission to index positions C*DAI(k)-C to C*DAI(k)-1 in the ACK/NACK sequence, wherein it is assumed that the index positions start from 0 and C is the bit number of ACK/NACK feedback of one downlink transmission; or
    assuming that a DAI value corresponding to one downlink transmission is DAI(k), mapping ACK/NACK of the one downlink transmission to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

4. The method of claim 1, wherein the TRP is represented as a beam group; wherein a beam in the beam group is represented by any one or more combinations of: Quasi-Co-Location, QCL, relationship, a resource and/or port of a reference signal related to beam measurement, beam index and Beam Pair Linkage, BPL.

5. The method of claim 4, wherein the receiving downlink transmissions comprises:
    obtaining beam group information;
    receiving downlink transmissions according to the beam group information.

6. A transmission method, applied to a base station, wherein the method comprises:
    transmitting downlink transmissions, wherein Downlink Assignment Indexes, DAIs, corresponding to the downlink transmissions cumulatively count the downlink transmissions at least in order of Transmission Reception Points, TRPs;
    receiving an ACK/NACK sequence, wherein ACK/NACK feedback information of the downlink transmissions is sorted in the ACK/NACK sequence according to the DAIs;
    wherein DAIs corresponding to the downlink transmissions cumulatively count the downlink transmissions at least in order of TRPs, which comprises at least one of:
    when there are downlink transmissions in at least two different downlink times in a same configured or activated target, that need to perform ACK/NACK feedbacks in a same uplink time, DAIs corresponding to the downlink transmissions cumulatively count the downlink transmissions in order of TRP first and time domain later, wherein the target comprises at least one of the serving cell, carrier, bandwidth part;

when the number of configured or activated targets is at least two, the DAIs corresponding to the downlink transmissions cumulatively count the downlink transmissions in order of TRP first and frequency domain later, or the DAIs corresponding to the downlink transmissions count independently in different targets and cumulatively count the downlink transmissions in order of TRPs corresponding to each target; or when the number of configured or activated targets is at least two and there are downlink transmissions in at least two different downlink times that need to perform ACK/NACK feedbacks in a same uplink time, the DAIs corresponding to the downlink transmissions cumulatively count the downlink transmissions in order of TRP first, frequency domain later and time domain last.

7. The method of claim 6, wherein ACK/NACK feedback information of the downlink transmissions is sorted in the ACK/NACK sequence according to the DAIs, which comprises:

when there is a downlink shared channel without corresponding downlink control channel in at least one of the at least two downlink times, determining that ACK/NACK of the downlink shared channel without corresponding downlink control channel is mapped to a predetermined position in an ACK/NACK sequence corresponding to the target;

the predetermined position is a first X-bit positions or last X-bit positions in the ACK/NACK sequence, wherein X is the bit number of the ACK/NACK of the downlink shared channel without corresponding downlink control channel.

8. The method of claim 6, wherein ACK/NACK feedback information of the downlink transmissions is sorted in the ACK/NACK sequence according to the DAIs, which comprises:

assuming that a DAI value corresponding to one downlink transmission is DAI(k), determining that ACK/NACK of the one downlink transmission is mapped to index positions C*DAI(k)-C to C*DAI(k)-1 in the ACK/NACK sequence, wherein it is assumed that the index positions start from 0 and C is the bit number of ACK/NACK feedback of one downlink transmission; or assuming that a DAI value corresponding to one downlink transmission is DAI(k), determining that ACK/NACK of the one downlink transmission is mapped to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

9. The method of claim 6, wherein the TRP is represented as a beam group;

wherein a beam in the beam group is represented by any one or more combinations of: Quasi-Co-Location, QCL, relationship, a resource and/or port of a reference signal related to beam measurement, beam index and Beam Pair Linkage, BPL.

10. The method of claim 9, wherein the transmitting downlink transmissions comprises:

determining a beam group, and transmitting configuration information indicating the beam group to a user equipment;

transmitting downlink transmissions according to beam group information.

11. A user equipment, comprising a memory, a processor and a transceiver;

the processor is configured to read programs in the memory and perform the process of:

receiving downlink transmissions via the transceiver; and sorting ACK/NACK feedback information of the downlink transmissions according to Downlink Assignment Indexes, DAIs, corresponding to the downlink transmissions to obtain and transmit an ACK/NACK sequence to be fed back, wherein the DAIs cumulatively count the downlink transmissions at least in order of Transmission Reception Points, TRPs;

wherein the processor is configured to perform at least one of:

when there are downlink transmissions in at least two different downlink times in a same configured or activated target, that need to perform ACK/NACK feedbacks in a same uplink time, the DAIs cumulatively count the downlink transmissions in order of TRP first and time domain later, wherein the target comprises at least one of the serving cell, carrier, bandwidth part;

when the number of configured or activated targets is at least two, the DAIs cumulatively count the downlink transmissions in order of TRP first and frequency domain later, or the DAIs count independently in different targets and cumulatively count the downlink transmissions in order of TRPs corresponding to each target; or when the number of configured or activated targets is at least two and there are downlink transmissions in at least two different downlink times that need to perform ACK/NACK feedbacks in a same uplink time, the DAIs cumulatively count the downlink transmissions in order of TRP first, frequency domain later and time domain last.

12. The user equipment of claim 11, wherein the processor is configured to: when there is a downlink shared channel without corresponding downlink control channel in at least one of the at least two downlink times, map ACK/NACK of the downlink shared channel without corresponding downlink control channel to a predetermined position in an ACK/NACK sequence corresponding to the target;

wherein the predetermined position is a first X-bit positions or last X-bit positions in the ACK/NACK sequence, wherein X is the bit number of the ACK/NACK of the downlink shared channel without corresponding downlink control channel.

13. The user equipment of claim 11, wherein the processor is configured to: assume that a DAI value corresponding to one downlink transmission is DAI(k), then map ACK/NACK of the one downlink transmission to index positions C*DAI(k)-C to C*DAI(k)-1 in the ACK/NACK sequence, wherein it is assumed that the index positions start from 0 and C is the bit number of ACK/NACK feedback of one downlink transmission; or assume that a DAI value corresponding to one downlink transmission is DAI(k), then map ACK/NACK of the one downlink transmission to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

14. The user equipment of claim 11, wherein the TRP is represented as a beam group; wherein a beam in the beam group is represented by any one or more combinations of: Quasi-Co-Location, QCL, relationship, a resource and/or port of a reference signal related to beam measurement, beam index and Beam Pair Linkage, BPL.

15. The user equipment of claim 14, wherein the processor is configured to: obtain beam group information; and receive downlink transmissions via the transceiver according to the beam group information.

16. A base station, comprising: a memory, a processor and a transceiver;
the processor is configured to read programs in the memory and perform the process of: transmitting downlink transmissions via the transceiver, wherein Downlink Assignment Indexes, DAIS, corresponding to the downlink transmissions cumulatively count the downlink transmissions at least in order of Transmission Reception Points, TRPs; and receiving an ACK/NACK sequence, wherein ACK/NACK feedback information of the downlink transmissions is sorted in the ACK/NACK sequence according to the DAIs;
wherein the processor is configured to perform at least one of:
when there are downlink transmissions in at least two different downlink times in a same configured or activated target, that need to perform ACK/NACK feedbacks in a same uplink time, DAIs corresponding to the downlink transmissions cumulatively count the downlink transmissions in order of TRP first and time domain later, wherein the target comprises at least one of the serving cell, carrier, bandwidth part;
when the number of configured or activated targets is at least two, DAIs corresponding to the downlink transmissions cumulatively count the downlink transmissions in order of TRP first and frequency domain later, or DAIs corresponding to the downlink transmissions count independently in different targets and cumulatively count the downlink transmissions in order of TRPs corresponding to each target; or
when the number of configured or activated targets is at least two and there are downlink transmissions in at least two different downlink times that need to perform ACK/NACK feedbacks in a same uplink time, DAIs corresponding to the downlink transmissions cumulatively count the downlink transmissions in order of TRP first, frequency domain later and time domain last.

17. The base station of claim 16, wherein the processor is configured to: when there is a downlink shared channel without corresponding downlink control channel in at least one of the at least two downlink times, determine that ACK/NACK of the downlink shared channel without corresponding downlink control channel is mapped to a predetermined position in an ACK/NACK sequence corresponding to the target;
wherein the predetermined position is a first X-bit positions or last X-bit positions in the ACK/NACK sequence, wherein X is the bit number of the ACK/NACK of the downlink shared channel without corresponding downlink control channel.

18. The base station of claim 16, wherein the processor is configured to: assume that a DAI value corresponding to one downlink transmission is DAI(k), then determine that ACK/NACK of the one downlink transmission is mapped to index positions C*DAI(k)-C to C*DAI(k)-1 in the ACK/NACK sequence, wherein it is assumed that the index positions start from 0 and C is the bit number of ACK/NACK feedback of one downlink transmission; or assume that a DAI value corresponding to one downlink transmission is DAI(k), then determine that ACK/NACK of the one downlink transmission is mapped to index positions $$\sum_{i=1}^{DAI(k)-1} C_i - C_{DAI(k)} \text{ to } \sum_{i=1}^{DAI(k)-1} C_i - 1,$$

wherein it is assumed that the index positions start from 0, $C_i$ is the bit number of ACK/NACK feedback of one downlink transmission of which a corresponding DAI value is i, and $C_{DAI(k)}$ is the bit number of ACK/NACK feedback of one downlink transmission of which a corresponding DAI value is DAI(k).

19. The base station of claim 16, wherein the TRP is represented as a beam group; wherein a beam in the beam group is represented by any one or more combinations of: Quasi-Co-Location, QCL, relationship, a resource and/or port of a reference signal related to beam measurement, beam index and Beam Pair Linkage, BPL.

20. The base station of claim 19, wherein the processor is configured to: determine a beam group and transmit configuration information indicating the beam group to a user equipment via the transceiver; and transmit downlink transmissions via the transceiver according to beam group information.

* * * * *